United States Patent
Park et al.

(10) Patent No.: US 10,668,694 B2
(45) Date of Patent: Jun. 2, 2020

(54) COMPOSITE FILM INCLUDING A GRAPHENE OXIDE COATING LAYER, A POROUS POLYMER SUPPORT INCLUDING THE SAME AND A METHOD FOR PREPARING THE SAME

(71) Applicant: IUCF-HYU (INDUSTRY-UNIVERSITY COOPERATION FOUNDATION HANYANG UNIVERSITY), Seoul (KR)

(72) Inventors: Ho Bum Park, Seoul (KR); Hyo Won Kim, Seoul (KR); Younghoon Cho, Seoul (KR); Byung Min Yoo, Gyeonggi-do (KR); Yoon Sung Hwang, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 263 days.

(21) Appl. No.: 15/125,334

(22) PCT Filed: Mar. 10, 2015

(86) PCT No.: PCT/KR2015/002264
§ 371 (c)(1),
(2) Date: Sep. 12, 2016

(87) PCT Pub. No.: WO2015/137678
PCT Pub. Date: Sep. 17, 2015

(65) Prior Publication Data
US 2018/0170002 A1    Jun. 21, 2018

(30) Foreign Application Priority Data

Mar. 12, 2014  (KR) .................... 10-2014-0028933
Mar. 18, 2014  (KR) .................... 10-2014-0031665
Mar. 21, 2014  (KR) .................... 10-2014-0033511

(51) Int. Cl.
*B32B 9/00* (2006.01)
*B01D 69/10* (2006.01)
(Continued)

(52) U.S. Cl.
CPC .............. *B32B 9/007* (2013.01); *B01D 69/10* (2013.01); *B01D 69/12* (2013.01); *B01D 71/027* (2013.01);
(Continued)

(58) Field of Classification Search
None
See application file for complete search history.

(56) References Cited

U.S. PATENT DOCUMENTS

2006/0138043 A1* 6/2006 Kharul ................ B01D 53/228
                                                  210/490
2010/0301279 A1* 12/2010 Nesper ................... B82Y 30/00
                                                  252/502
(Continued)

FOREIGN PATENT DOCUMENTS

CN    102600734    7/2012
CN    102908906    2/2013
(Continued)

OTHER PUBLICATIONS

Lee et al., Polymeric Membrane for Water Treatment, Apr. 24, 2013, machine translation of KR 20130040738 (Year: 2013).*
(Continued)

*Primary Examiner* — Chinessa T. Golden
(74) *Attorney, Agent, or Firm* — Duane Morris LLP; Gregory M. Lefkowitz; Jason M. Nolan

(57) ABSTRACT

The present invention relates to a composite film comprising a graphene oxide coating layer, a porous polymer support
(Continued)

comprising the same, and a method for preparing the same. More particularly, the present invention relates to a composite film comprising a graphene oxide coating layer with improved permeability and stability, a porous polymer support for a composite film comprising a graphene oxide coating layer with improved permeability, and a method for preparing the same.

21 Claims, 23 Drawing Sheets

(51) Int. Cl.
*B01D 69/12* (2006.01)
*B01D 71/02* (2006.01)
*C08K 3/04* (2006.01)
*B32B 27/28* (2006.01)
*B32B 27/30* (2006.01)
*C08K 5/05* (2006.01)
*C08L 39/06* (2006.01)
*C08L 79/08* (2006.01)
*C09D 7/63* (2018.01)

(52) U.S. Cl.
CPC .......... *B32B 27/286* (2013.01); *B32B 27/304* (2013.01); *B32B 27/308* (2013.01); *C08K 3/042* (2017.05); *C08K 5/05* (2013.01); *C08L 39/06* (2013.01); *C08L 79/08* (2013.01); *C09D 7/63* (2018.01)

(56) References Cited

U.S. PATENT DOCUMENTS

| | | | | |
|---|---|---|---|---|
| 2012/0129736 A1* | 5/2012 | Tour | ............... | B82Y 30/00 507/140 |
| 2012/0255899 A1 | 10/2012 | Choi et al. | | |
| 2012/0277360 A1* | 11/2012 | Scheffer | ............... | C08K 3/04 524/237 |
| 2012/0325296 A1* | 12/2012 | Woo | ............... | H01L 29/778 136/252 |
| 2013/0270188 A1* | 10/2013 | Karnik | ............... | B01D 53/228 210/650 |
| 2013/0284665 A1* | 10/2013 | Lee | ............... | B01D 67/0079 210/489 |

FOREIGN PATENT DOCUMENTS

| | | |
|---|---|---|
| CN | 103338845 | 10/2013 |
| JP | 07-047221 | 2/1995 |
| JP | 2002-293656 | 10/2002 |
| JP | 2013-75264 | 4/2013 |
| JP | 2013-22588 | 3/2020 |
| KR | 1020110033111 | 3/2011 |
| KR | 10-2011-0066683 | 6/2011 |
| KR | 1020110059173 | 6/2011 |
| KR | 10-2012-0100379 | 9/2012 |
| KR | 20120099189 A * | 9/2012 |
| KR | 1020120099189 | 9/2012 |
| KR | 1020120140214 | 12/2012 |
| KR | 20130040738 A * | 4/2013 |
| KR | 1020130040738 | 4/2013 |
| KR | 1020130128686 | 11/2013 |
| KR | 10-2014-0004298 | 1/2014 |
| KR | 1020140042576 | 4/2014 |

OTHER PUBLICATIONS

Bang et al., Reverse Osmosis Membranes, Sep. 7, 2012, machine translation of KR 2012-0099189A (Year: 2012).*

Song, et al., "Preparation of Polyethylenimine-Functionalized Graphene Oxide Composite and Its Application in Electrochemical Ammonia Sensors", Electroanalysis, 25, No. 2, 523-530, 2013.

Kim, et al., "Polysulfone and functionalized carbon nanotube mixed matrix membranes for gas separation: Theory and experiment", Journal of Membrane Science, 294, 147-158, 2007.

Bon et al., "Wettability and switching of electrical conductivity in UV irradiated graphene oxide films", Diamond and Related Materials, 20, 2011, pp. 871-874.

Zheng, "Dictionary of New Knowledge of Science and Technology", Jinghua Publishing House, Jul. 31, 2001, English translation, p. 949.

Yu, "Membrane Technology and Its Application in Water Treatment", China Water Conservancy and Hydropower Press, Sep. 2011, English translation, pp. 59-60.

Sun, "New Fiber Materials", University Press, Aug. 2007, pp. 229-230.

Yang et al., "Preparation and Optimization of Polyethersulfone Ultrafiltration Membranes", Henan Chemical Industry, No. 5, May 2005, pp. 13-15.

* cited by examiner

Comparative Example (20°)

(a)  (b)  (c)

COMPOSITE FILM INCLUDING A GRAPHENE OXIDE COATING LAYER, A POROUS POLYMER SUPPORT INCLUDING THE SAME AND A METHOD FOR PREPARING THE SAME

CROSS-REFERENCE TO RELATED APPLICATIONS

This application is a § 371 national stage entry of International Application No. PCT/KR2015/002264, on Mar. 10, 2015, which claims priority to South Korean Patent Application No, 10-2014-0028933, filed on Mar. 12, 2014, South Korean Patent Application No, 10-2014-0031665, filed on Mar. 18, 2014, and South Korean Patent Application No. 10-2014-0033511, filed on Mar. 21, 2014, the entire contents of which are incorporated herein by reference.

TECHNICAL FIELD

The present invention relates to a composite membrane including a graphene oxide coating layer, a porous polymer support including the same and a method for preparing the same. More specifically, the present invention relates to a composite membrane including a graphene oxide coating layer with improved permeability and stability, a porous polymer support for a composite film including a graphene oxide coating layer with improved permeability, and a method for preparing the same.

BACKGROUND ART

Composite membranes (separation membranes) are widely applied to a variety of fields including gas separation membranes, water disposal separation membranes, ion separation membranes, secondary battery separation membranes and the like. Materials for composite membranes are changed according to the corresponding application field. However, permeability is an essential requirement for excellent separation membranes, regardless of the type of the application field.

Conventional separation membranes focus on carbon membranes produced by finally carbonizing a single membrane made of a polymer. In general, carbon membranes are fine porous carbon membranes obtained by carbonizing membrane-type polymer precursors at high temperatures and the carbon membranes thus obtained have high permeability and selectivity, and long to term stability, durability, chemical resistance and high-temperature stability, but, disadvantageously, have bad mechanical properties such as elasticity and tensile strength, and entail an increase in production costs caused by a production process conducted at a high temperature of 600 to 1,000° C. for a long time, and low processability resulting from difficulty in formation of thin films, which are obstacles to commercialization, and have a big problem of occurrence of membrane defects during production (Patent Document 1: Korean Patent Laid-open Publication No. 2011-0033111).

In addition, as carbon nanotube membranes are reported to have excellent gas permeability and selectivity, research on composite membranes in which carbon nanotubes are incorporated in a polymer matrix is actively underway. However, the trade-off between gas permeability and selectivity is not still solved satisfactorily (Non-patent Document 1: Sangil Kim et al., J. Membr. Sci. 294 (2007) 147-158).

Recently, graphene, which has a single layer having a two-dimensional plane structure, exhibits excellent mechanical strength, and thermal and chemical properties and can be produced into a thin film, has been highlighted and cases in which composite membranes are produced by transferring graphene to porous polymer supports are reported. However, these composite membranes have problems of low permeability to several gases due to densely laminated structure of two-dimensional particles and relatively long permeation channel formed thereby (Patent Document 2: US Patent Publication No. 2012-0255899).

Meanwhile, research on separation membranes in which graphene oxide is coated on a support begins to be conducted in the application field of separation membranes. Representative examples of such separation membranes include gas separation membranes, water disposal separation membranes and ion separation membranes. Such research aims to utilize porous polymer supports coated with graphene oxide in gas separation membranes, water disposal separation membranes, ion separation membranes and the like. When porous polymer supports coated with graphene oxide are used for separation membranes, selectivity and permeability of subject substances to be separated can be improved. Accordingly, research using graphene oxide is continuously underway. In particular, there is research on incorporation of functionalized graphene, such as graphene oxide, into a porous polymer support to improve permeation flux or selectivity to a certain gas mixture (Patent Document 3: Korean Patent Laid-open Publication No. 2013-0128686).

However, there is still a demand for further improved permeability of separation membranes, although the separation membranes are produced by coating supports with graphene oxide, like Patent Document 3.

In addition, composite membranes with a simple structure including laminated oxide graphene, for example, composite membranes produced by coating with graphene oxide, like Patent Document 3, are disadvantageously easily delaminated by adjacent physical and chemical stimulus.

In particular, when separation membranes are produced by coating supports with graphene oxide, like Patent Document 3, attractive force between graphene oxide and the porous polymer support may be lowered. In this case, the graphene oxide coating layer is disadvantageously easily delaminated due to weak bonding force between the porous polymer support and the graphene oxide coating layer. In addition, the biggest problem occurring when separation membranes are produced by coating supports with graphene oxide is deteriorated permeability due to dense structure of the porous polymer support. That is, there is a problem in which the effects of improving permeability and selectivity owing to the graphene oxide coating layer are reduced by low permeability of the porous polymer support.

DISCLOSURE

Technical Problem

Therefore, it is one object of the present invention to provide a composite membrane including a graphene oxide coating layer which has considerably improved permeability to a substance by increasing a channel in a graphene oxide coating layer and significantly reduces delamination although neighboring physical and chemical stimuli are applied thereto.

It is another object of the present invention to increase surface functionality of a porous polymer support for composite membranes including a graphene oxide coating layer and thereby improve permeability. In addition, it is another object of the present invention to provide a porous polymer support for composite membranes including a graphene oxide coating layer which is not easily delaminated due to increased attractive force between the porous polymer support and graphene oxide.

Technical Solution

In accordance with one aspect of the present invention, the above and other objects can be accomplished by the provision of a composite membrane including a graphene oxide coating layer with improved permeability including a porous polymer support and a graphene oxide coating layer having an amide bond formed between a carboxyl group of graphene oxide and an amine group on the porous polymer support.

In another aspect of the present invention, provided is a first method of producing a composite membrane including a graphene oxide coating layer with improved permeability including 1) coating a graphene oxide dispersion on a porous support, and 2) treating the graphene oxide coated on the porous support with an amine solution to form a graphene oxide coating layer having an amide bond formed between a carboxyl group of graphene oxide and an amine group.

In another aspect of the present invention, provided is a second method of producing a composite membrane including a graphene oxide coating layer with improved permeability including 1) mixing a graphene oxide dispersion with an amine solution, and 2) coating the mixed solution on a porous support to form a graphene oxide coating layer having an amide bond formed between a carboxyl group of graphene oxide and an amine group.

In another aspect of the present invention, provided is a composite membrane including a graphene oxide coating layer with improved stability including a porous polymer support and a graphene oxide coating layer having an amide bond formed between a carboxyl group of graphene oxide and an amine group on the porous polymer support.

In another aspect of the present invention, provided is a first method of producing a composite membrane including a graphene oxide coating layer with improved stability including 1) coating a graphene oxide dispersion on a porous support, and 2) treating the graphene oxide coated on the porous support with an amine solution to form a graphene oxide coating layer having an amide bond formed between a carboxyl group of graphene oxide and an amine group.

In another aspect of the present invention, provided is a second method of producing a composite membrane including a graphene oxide coating layer with improved stability including 1) mixing a graphene oxide dispersion with an amine solution, and 2) coating the mixed solution on a porous support to form a graphene oxide coating layer having an amide bond formed between a carboxyl group of graphene oxide and an amine group.

In another aspect of the present invention, provided is a porous polymer support for composite membranes including a graphene oxide coating layer with improved permeability including a hydrophilic amine compound and having a surface porosity of 5 to 20%.

In another aspect of the present invention, provided is a method of producing a porous polymer support for composite membranes including a graphene oxide coating layer with improved permeability including 1) mixing a compound for porous polymer supports and a hydrophilic amine compound with a solvent to prepare a mixed solution and 2) curing the mixed solution.

Effects of the Invention

Among composite membranes according to the present invention, the composite membrane including a graphene oxide coating layer with improved permeability exhibits considerably improved permeability due to increased channel in a graphene oxide coating layer, as compared to conventional composite membranes in which graphene oxide is coated on a porous support. In addition, the composite membrane, which is obtained by a method of producing the composite membrane including a graphene oxide coating layer with improved permeability according to the present invention, exhibits improved permeability owing to increased channel in the graphene oxide coating layer. In particular, both water permeability of the water disposal separation membrane and gas permeability of the gas separation membrane are significantly improved.

In addition, among composite membranes according to the present invention, the composite membrane including a graphene oxide coating layer with improved stability is effective in significantly reducing delamination although neighboring physical and chemical stimuli are applied thereto. As a result, it is possible to provide composite membranes with considerably improved stability and durability, as compared to conventional composites membrane including a graphene oxide coating layer. In addition, when the composite membrane is produced by the method of producing the composite membrane including a graphene oxide coating layer with improved stability according to the present invention, delamination of the graphene oxide coating layer can be considerably reduced, and stability and durability of the composite membrane can be thus improved. Consequently, the composite membrane including a graphene oxide coating layer with improved stability according to the present invention and the composite membrane produced by the method can greatly improve lifespan although the composite membrane includes the graphene oxide coating layer.

In addition, the porous polymer support for composite membranes including a graphene oxide coating layer according to the present invention exhibits improved surface porosity and thus improves permeability, as compared to conventional porous polymer supports. That is, it is possible to solve the problem of conventional porous polymer supports, in which the effects improving permeability and selectivity based on the graphene oxide coating layer are reduced due to low surface porosity. In addition, due to increased attractive force between the graphene oxide and the porous polymer support, the graphene oxide coating layer is not easily delaminated from the porous polymer support and a uniform surface is formed.

DESCRIPTION OF DRAWINGS

The above and other objects, features and other advantages of the present invention will be more clearly understood from the following detailed description taken in conjunction with the accompanying drawings, in which.

BEST MODE

Figure 1:
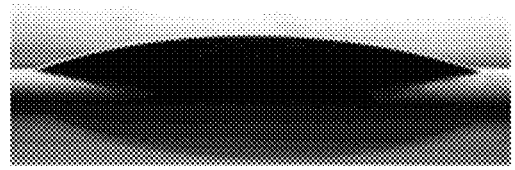
FIG. 1 is an image showing a surface contact angle of a graphene coating layer according to Comparative Example 1-1.

Accordingly, as a result of repeated research to develop composite membranes which include a graphene oxide coating layer and exhibit excellent substance permeability and stability, the present inventors found a composite membrane including a graphene oxide coating layer, a porous polymer support including the same and a method of producing the same, thus completing the present invention.

Specifically, the composite membrane including a graphene oxide coating layer with improved permeability according to the present invention includes a graphene oxide coating layer having a contact angle of 20 to 60° formed on a porous polymer support.

The contact angle of 20 to 60° is formed by UV irradiation or plasma treatment. When UV irradiation or plasma treatment is conducted on the graphene oxide coating layer, the channel in the graphene oxide coating layer is increased, contact angle is increased and substance permeability is thus improved. Specifically, gas separation membranes have improved gas permeability and water disposal separation membrane have improved water permeability. Due to the UV irradiation or plasma treatment, roughness of the graphene oxide coating layer is increased and contact angle is increased to 20 to 60° and permeability is thus improved, than before UV irradiation or plasma treatment.

There is no particular limitation as to the UV irradiation, but UV irradiation is preferably performed at 200 to 400 nm for 0.5 to 10 minutes. When UV is irradiated to the surface of the coating layer, the structure of the coating layer is changed, roughness is increased, a permeation channel in the graphene oxide coating layer is increased and permeability can be further improved. In addition, when UV irradiation time falls within the range, permeability improvement is preferably maximized.

There is no particular limitation as to the plasma treatment, but the plasma treatment is preferably conducted at 10 to 100 W for 1 to 15 minutes. When the plasma treatment is conducted, the structure of coating layer is changed, roughness is increased, a permeation channel in the graphene oxide coating layer is increased and permeability can be further improved. In addition, when the plasma treatment time falls within the range, permeability improvement is preferably maximized.

Meanwhile, any porous polymer support can be used without particular limitation so long as it is useful as a porous polymer support for composite membranes or separation membranes and the porous polymer support preferably includes one or more selected from the group consisting of polysulfone, polyether sulfone, polyimide, polyether imide, polyamide, polyacrylonitrile, cellulose acetate, cellulose triacetate and polyvinylidene fluoride.

When the composite membrane including a graphene oxide coating layer according to the present invention is used as a gas separation membrane, gas permeability is improved. The gas permeability of the gas separation membrane is preferably 50 to 200 GPU.

In addition, when the composite membrane including a graphene oxide coating layer with improved permeability according to the present invention is used as a water disposal separation membrane, water permeability is improved. The water permeability of the water disposal separation membrane is preferably 1 to 10 LMH/bar. More preferably, when UV irradiation is conducted, water permeability of the water disposal membrane may be 1 to 10 LMH/bar and when plasma treatment is conducted, water permeability of the water disposal membrane may be 1 to 5 LMH/bar.

A method of producing the composite membrane including a graphene oxide coating layer with improved permeability includes:

1) coating a graphene oxide dispersion on a porous polymer support; and 2) conducting UV irradiation or plasma treatment after step 1) to form a graphene oxide coating layer having a contact angle of 20 to 60°.

After the UV irradiation or plasma treatment in step 2), the contact angle of the graphene oxide coating layer is 20 to 60°.

There is no particular limitation as to the UV irradiation in step 2), but the UV irradiation is preferably performed at 200 to 400 nm for 0.5 to 10 minutes.

There is no particular limitation as to the plasma treatment in step 2), but the plasma treatment is preferably performed at 10 to 100 W for 1 to 15 minutes.

Meanwhile, any porous polymer support can be used without particular limitation so long as it is useful as a porous polymer support for composite membranes or separation membranes and preferably includes one or more selected from the group consisting of polysulfone, polyether sulfone, polyimide, polyether imide, polyamide, polyacrylonitrile, cellulose acetate, cellulose triacetate and polyvinylidene fluoride.

When the composite membrane including a graphene oxide coating layer with improved permeability produced by the method according to the present invention is used as a gas separation membrane, gas permeability is improved. The gas permeability of the gas separation membrane is preferably 50 to 200 GPU.

In addition, when the composite membrane including a graphene oxide coating layer with improved permeability produced by the method according to the present invention is used as a water separation membrane, water permeability is improved. The water permeability of the water separation membrane is preferably 1 to 10 LMH/bar. In addition, more preferably, when UV irradiation is conducted, water permeability of the water disposal membrane may be 1 to 10 LMH/bar and when plasma treatment is conducted, water permeability of the water disposal membrane may be 1 to 5 LMH/bar.

Meanwhile, the composite membrane including a graphene oxide coating layer with improved stability according to another embodiment of the present invention includes a porous polymer support and a graphene oxide coating layer having an amide bond formed between a carboxyl group of graphene oxide and an amine group on the porous polymer support.

Any amine group may be used without particular limitation so long as it has amine and the amine group is preferably included in a diamine or triamine-containing compound, and is more preferably included in one or more compounds selected from the group consisting of ethylenediamine, diethylenetriamine, triethylenetetramine, tetraethylenepentamine, pentaethylenehexamine, phenylenediamine (PD) and polyethyleneimine.

When the carboxyl group of graphene oxide is bonded to the amine group to form an amide bond, a phenomenon, in which the graphene oxide coating layer is delaminated by a physical or chemical stimulus, can be significantly reduced. In particular, the graphene oxide coating layer is not easily delaminated under aqueous environments by imparting stability to the graphene oxide coating layer which is easily delaminated by external moisture. Thus, when the composite membrane is used as a water permeation membrane, the graphene oxide coating layer is not easily delaminated and, when the composite membrane is used as a gas separation membrane, the graphene oxide coating layer is not easily delaminated even when exposed to high humidity or moisture environments. In addition, the composite membrane including a graphene oxide coating layer having an amide bond thus formed has stability so that the graphene oxide coating layer is not delaminated even upon exposure to physical or chemical stimulus such as an acid or base.

In addition, the graphene oxide coating layer is preferably formed by one or more coating methods selected from the group consisting of vapor filtration, thin film coating, spin coating, spray coating and dip coating. Preferably, such a method is used because the graphene oxide coating layer including the amide compound is coated so that uniform chemical cross-linkage is formed in the graphene oxide coating layer.

In addition, pH of the graphene oxide coating layer is preferably 3 to 5 and there is no particular limitation as to a method of adjusting pH to this level. Preferably, pH adjustment is preferably carried out by treating the graphene oxide coating layer with an acidic solution or the like because amide bonding is facilitated.

Meanwhile, any porous polymer support can be used without particular limitation so long as it is useful as a porous polymer support for composite membranes or separation membranes and the porous polymer support preferably includes one or more selected from the group consisting of polysulfone, polyether sulfone, polyimide, polyether imide, polyamide, polyacrylonitrile, cellulose acetate, cellulose triacetate and polyvinylidene fluoride.

The composite membrane including a graphene oxide coating layer with improved stability according to the present invention has an improved stability because the graphene oxide coating layer is not easily delaminated. Thus, the composite membrane including a graphene oxide coating layer with improved stability can be used as a gas separation membrane or a water disposal separation membrane.

Meanwhile, when the composite membrane including a graphene oxide coating layer with improved stability according to the present invention is used as a water disposal separation membrane, the separation membrane preferably has a high water permeability of 2 to 20 LMH/bar, although an amide bond is formed in the graphene oxide coating layer.

A first method of producing the composite membrane including a graphene oxide coating layer with improved stability includes:

1) coating a graphene oxide dispersion on a porous support; and 2) treating the graphene oxide coated on the porous support with an amine solution to form a graphene oxide coating layer having an amide bond formed between a carboxyl group of graphene oxide and an amine group.

In addition, a first method of producing the composite membrane including a graphene oxide coating layer with improved stability includes:

1) mixing a graphene oxide dispersion with an amine solution; and 2) coating the mixed solution on a porous support to form a graphene oxide coating layer having an amide bond formed between a carboxyl group of graphene oxide and an amine group.

The composite membrane including a graphene oxide coating layer with improved stability produced by the first or second method according to the present invention can significantly reduce delamination of the graphene oxide coating layer by the amide bond formed between a carboxyl group of graphene oxide and an amine group, although neighboring physical and chemical stimuli are applied thereto. In particular, the graphene oxide coating layer is not easily delaminated under aqueous environments by imparting stability to the graphene oxide coating layer which is easily delaminated by external moisture. Thus, when the composite membrane produced by the method is used as a water permeation membrane, it is not easily delaminated. When the composite membrane produced by the method is used as a gas separation membrane, the graphene oxide coating layer is not easily delaminated even when exposed to high humidity or moisture environments. In addition, the composite membrane including a graphene oxide coating layer having an amide bond thus formed has stability so that the graphene oxide coating layer is not delaminated even upon exposure to physical or chemical stimulus such as an acid or base.

Meanwhile, in the first or second production method, the amine is preferably present in an amount of 0.1 to 2.0% by weight in the amine solution. When the amine is present in an amount of less than 0.1% by weight, reaction is disadvantageously insufficient, and when the amine is present in an amount of exceeding 2.0% by weight, disadvantageously, the amount is unnecessarily excessive.

In addition, in the second production method, the amine is preferably present in an amount of 0.01 to 2.0% by weight in the total mixed solution, and when the amine is present in an amount of less than 0.01% by weight, reaction is disadvantageously insufficient, and when the amine is present in an amount of exceeding 2.0% by weight, disadvantageously, the amount is unnecessarily excessive.

In addition, any amine solution may be used without particular limitation so long as it is an amine group-containing solution, and the amine solution is preferably a compound containing diamine or triamine, and more preferably includes one or more selected from the group consisting of ethylenediamine, diethylenetriamine, triethylenetetramine, tetraethylenepentamine, pentaethylenehexamine, phenylenediamine (PD) and polyethyleneimine.

In addition, the first or second production method may further include adjusting pH to 3 to 5 after step 2). The adjustment of pH to 3 to 5 can facilitate reaction between the carboxyl group of graphene oxide and the amine group of the amine solution. There is no particular limitation as to a method of adjusting pH to this level. Preferably, pH adjustment is preferably carried out by treating the graphene oxide coating layer with an acidic solution. In this case, there is advantageously an effect in which the surface of the graphene oxide coating layer is further uniform.

In addition, the graphene oxide coating layer is preferably formed by any one or more methods selected from the group consisting of vapor filtration, thin film coating, spin coating, spray coating and dip coating.

Meanwhile, any porous polymer support can be used without particular limitation so long as it is useful as a porous polymer support for composite membranes or separation membranes and preferably includes one or more selected from the group consisting of polysulfone, polyether sulfone, polyimide, polyether imide, polyamide, polyacrylonitrile, cellulose acetate, cellulose triacetate and polyvinylidene fluoride.

Regarding the composite membrane including a graphene oxide coating layer with improved stability produced by the first or second method according to the present invention, the graphene oxide coating layer is not easily delaminated and stability is thus improved. The composite membrane thus produced can be used as a gas separation membrane or a water disposal separation membrane.

Meanwhile, when the composite membrane including a graphene oxide coating layer with improved stability by the method according to the present invention is used as a water disposal separation membrane, the separation membrane preferably also has a high water permeability of 2 to 20 LMH/bar, although an amide bond is formed on the graphene oxide coating layer.

Meanwhile, the porous polymer support for composite membranes with improved permeability including a graphene oxide coating layer according to another embodiment of the present invention includes a hydrophilic amine compound and has a surface porosity of 5 to 20%.

The porous polymer support for composite membranes including a graphene oxide coating layer with improved permeability according to the present invention has an improved surface porosity because the hydrophilic amine compound is incorporated into the porous polymer support. Thus, the present invention solves a problem in which graphene oxide coating effects are reduced due to low permeability of the porous polymer support although graphene oxide is coated to improve permeability and selectivity and is directed to a porous polymer support with high permeability.

Meanwhile, the porous polymer support, excluding a hydrophilic amine compound, preferably includes one or more selected from the group consisting of polysulfone (PSF), polyether sulfone (PES), polyvinylidene fluoride (PVDF) and polyacrylonitrile (PAN). When the porous polymer support is bonded to the hydrophilic amine compound, only the porous polymer support has an improved surface porosity and thus considerably improves permeability. That is, materials used for conventional porous polymer supports for composite membranes include polysulfone, polyether sulfone, polyimide, polyether imide, polyamide, polyacrylonitrile, cellulose acetate, cellulose triacetate, polyvinylidene fluoride and the like. All of them are not applied to the present invention. In addition, the porous polymer support according to the present invention reacts with the hydrophilic amine compound to enhance attractive force between the graphene oxide coating layer and the porous polymer support, thus preventing easy delamination of the graphene oxide coating layer and realizing uniform surface coating.

In addition, the hydrophilic amine compound is preferably polyvinylpyrrolidone (PVP) or polyethylenimine (PEI). In this case, the hydrophilic amine compound sufficiently reacts with the porous polymer support according to the present invention, thus considerably improving surface porosity of the porous polymer support. In addition, surface or entire porosity can be controlled by controlling the molecular weight and content of PVP or PEI used as the hydrophilic amine compound.

The hydrophilic amine compound is preferably present in an amount of 0.1 to 10% by weight in the porous polymer support. When the hydrophilic amine compound is present in an amount of less than 0.1% by weight, it is disadvantageously difficult to sufficiently improve the attractive force between the porous polymer support and graphene oxide, and when the hydrophilic amine compound is present in an amount exceeding 10% by weight, pore size and permeability of the porous polymer support are significantly reduced and, disadvantageously, the amount is unnecessarily excessive.

In addition, the porous polymer support preferably includes one or more selected from the group consisting of methanol, ethanol and isopropyl alcohol because the surface porosity of the porous polymer support can be significantly improved.

The porous polymer support according to the present invention maximizes graphene oxide coating effects due to increased surface porosity. In addition, the attractive force between the graphene oxide coating layer and the porous polymer support is increased and the graphene oxide coating layer is not easily delaminated from the porous polymer support and a uniform surface is formed.

A method of producing the porous polymer support for the composite membrane including a graphene oxide coating layer with improved permeability according to the present invention includes:

1) mixing a compound for a porous polymer support and a hydrophilic amine compound with a solvent to prepare a mixed solution; and 2) curing the mixed solution.

The porous polymer support includes a graphene oxide coating layer which includes one or more selected from the group consisting of polysulfone (PSF), polyether sulfone (PES), polyvinylidene fluoride (PVDF) and polyacrylonitrile (PAN). The hydrophilic amine compound is preferably polyvinylpyrrolidone (PVP) or polyethylenimine (PEI). When the porous polymer support is mixed with the hydrophilic amine compound, the surface porosity of the porous polymer support is considerably increased and permeability is considerably increased.

The compound for the porous polymer support is preferably present in an amount of 5 to 25% by weight in the mixed solution of step 1). When the porous polymer support is present in an amount of less than 5% by weight, disadvantageously, characteristics of the porous polymer support for composite membranes cannot be exerted and, when the porous polymer support is present in an amount exceeding 25% by weight, disadvantageously, the surface porosity is significantly deteriorated. In addition, the hydrophilic amine compound is preferably present in an amount of 0.1 to 10% by weight in the mixed solution of the step 1). When the hydrophilic amine compound is present in an amount of less than 0.1% by weight, it is disadvantageously difficult to sufficiently improve attractive force between the graphene oxide coating layer and the porous polymer support, and when the hydrophilic amine compound is present in an amount exceeding 10% by weight, pore size and permeability of the porous polymer support are significantly decreased and disadvantageously, the amount is unnecessarily excessive, thus causing uneconomical efficiency. Meanwhile, surface or entire porosity can be controlled by controlling the molecular weight and content of PVP or PEI used as the hydrophilic amine compound.

In addition, the mixed solution of step 1) preferably further includes one or more selected from the group consisting of methanol, ethanol and isopropyl alcohol because surface porosity of the porous polymer support is considerably increased, than when the mixed solution includes only a hydrophilic amine compound. In addition, one or more selected from the group consisting of methanol, ethanol and isopropyl alcohol are preferably present in an amount of 0.1 to 20% by weight in the mixed solution. When the one or more selected from the group consisting of methanol, ethanol and isopropyl alcohol are present in an amount of less than 0.1% by weight, disadvantageously, the surface porosity expansion effect cannot be sufficiently exerted, and when the one or more selected from the group consisting of methanol, ethanol and isopropyl alcohol are present in an amount exceeding 20% by weight, disadvantageously, curing of polymers by phase transition is not sufficiently exerted. In addition, the one or more selected from the group consisting of methanol, ethanol and isopropyl alcohol are more preferably present in an amount of 0.1 to 15% by weight.

In addition, when the porous polymer support is treated with plasma, after step 2), advantageously, surface porosity is further increased and permeability is thus further improved.

Meanwhile, the porous polymer support for composite membranes including a graphene oxide coating layer has a surface porosity of 5 to 20% and thus much lower permeability than conventional porous polymer supports.

The porous polymer support for composite membranes including a graphene oxide coating layer produced by the method according to the present invention has considerably increased surface porosity and thus can maximize an effect of coating graphene oxide on the porous polymer support. In addition, the attractive force between the graphene oxide coating layer and the porous polymer support is maximized, and uniform coating is possible while preventing easy delamination of the graphene oxide coating layer from the porous polymer support.

The graphene oxide composite membrane including the porous polymer support according to the present invention has a considerably improved permeability. In particular, when the composite membrane is used as a gas separation membrane, high gas permeability of 50 to 300 GPU is obtained. In addition, when the composite membrane is used as a water disposal separation membrane, high water permeability of 2-20 LMH/bar can be obtained as well.

MODE FOR INVENTION

Hereinafter, the present invention will be described in more detail with reference to preferred examples such that the present invention can be easily implemented by a person having ordinary skill in the field to which the present invention pertains. However, the present invention can be realized in various different forms and is not limited to the examples set forth herein.

1. Examples and Test Examples Related to Composite Membrane Including Graphene Oxide Coating Layer with Improved Permeability Example 1

Example 1-1: UV Irradiation of Graphene Oxide Coating Layer

A graphene oxide dispersion was uniformly applied to a thickness of 10 nm on a polyethersulfone porous polymer support by spin coating to produce a graphene oxide composite membrane and UV irradiation was conducted on the graphene oxide coating layer. At this time, UV irradiation was conducted at two different wavelengths. First UV irradiation (Example 1-1-1) was conducted at a wavelength of 265 nm for 5 minutes. Second UV irradiation (Example 1-1-2) was conducted at a wavelength of 352 nm for 5 minutes.

Example 1-2: Plasma Treatment of Graphene Oxide Coating Layer

A graphene oxide dispersion was uniformly applied to a thickness of 10 nm on a porous support layer by spin coating to produce a graphene oxide composite membrane and the graphene oxide coating layer was treated with oxygen plasma. At this time, the oxygen plasma treatment was conducted at two different intensities. The first oxygen plasma treatment (Example 2-1-1) was conducted at a wavelength of 265 nm for 5 minutes. The second UV irradiation (Example 1-1-2) was conducted at 50 W for 5 minutes. The second plasma treatment (Example 1-2-2) was conducted at 100 W for 5 minutes.

Comparative Example 1-1

A graphene oxide dispersion was uniformly applied to a thickness of 10 nm on a porous support by spin coating to produce a graphene oxide composite membrane, and UV irradiation or plasma treatment was not conducted, unlike Example described above.

Test Example 1

Test Example 1-1: Measurement of Contact Angle of Graphene Oxide Coating Layer

Figure 2:
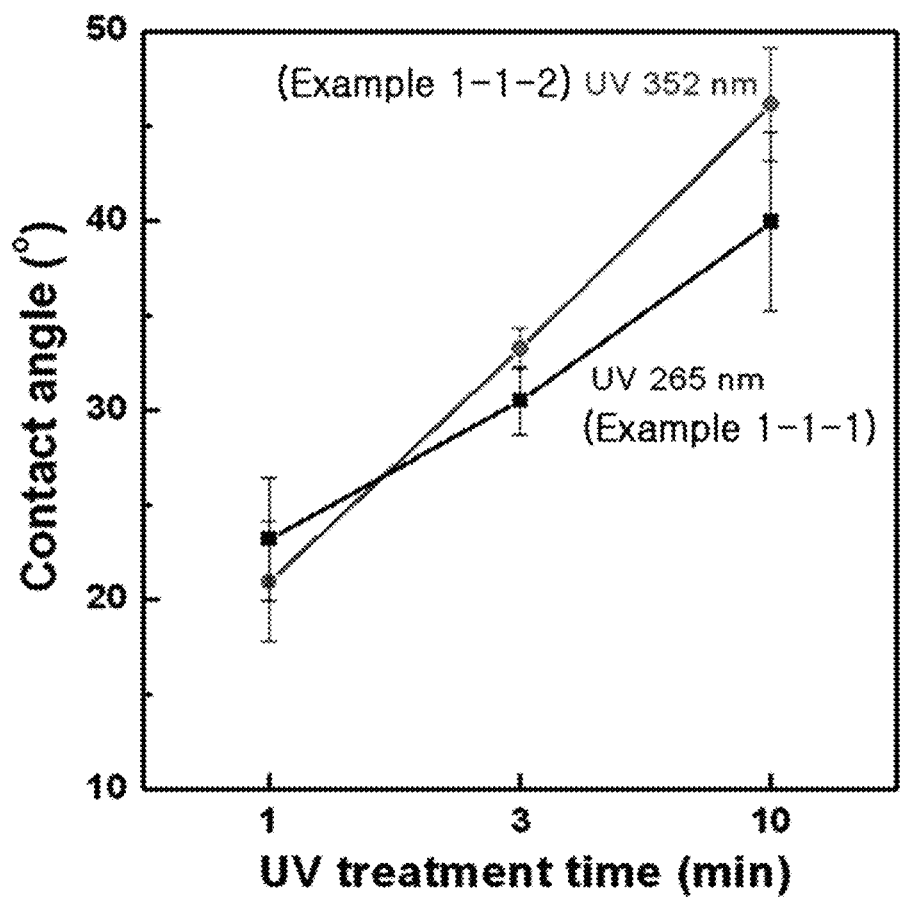
FIG. 2 is an image showing variation in surface contact angle of a graphene coating layer according to Example 1-1.
Figure 3:
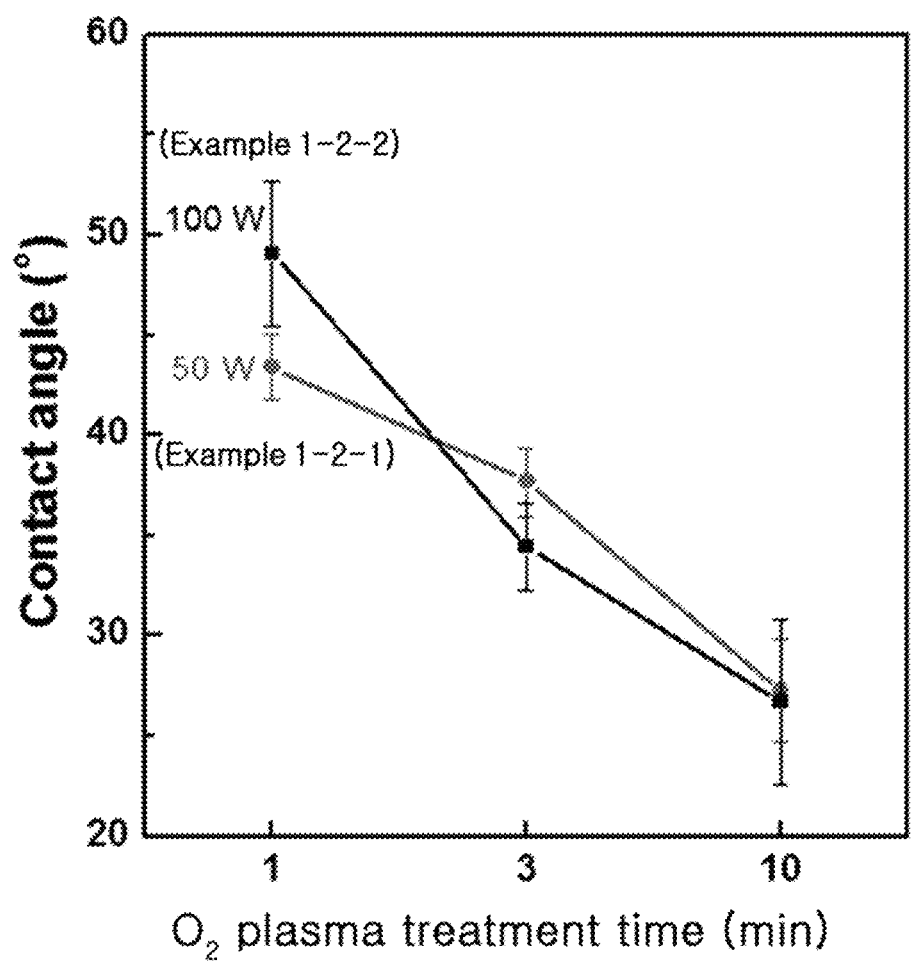
FIG. 3 is an image showing variation in surface contact angle of a graphene coating layer according to Example 1-2.

The contact angles of the graphene oxide coating layers according to Example 1-1, Example 1-2 and Comparative Example 1-1 were measured. In this test, the contact angle was measured by measuring an angle formed between a water drop and the surface of the coating layer and results are shown in FIGS. 1 to 3. As a result, Comparative Example 1-1 exhibited a contact angle of 20°, as can be seen from FIG. 1, whereas Example 1-1 exhibited a contact angle of 20 to 50°, as can be seen from FIG. 2, and Example 1-2 exhibited a contact angle of 20 to 60°, as can be seen from FIG. 3. The results indicate that, when UV irradiation or plasma treatment is conducted on the graphene oxide coating layer, the contact angle of graphene oxide coating layer is increased.

Test Example 1-2: Measurement of Gas Permeability of Gas Separation Membrane

Figure 4:
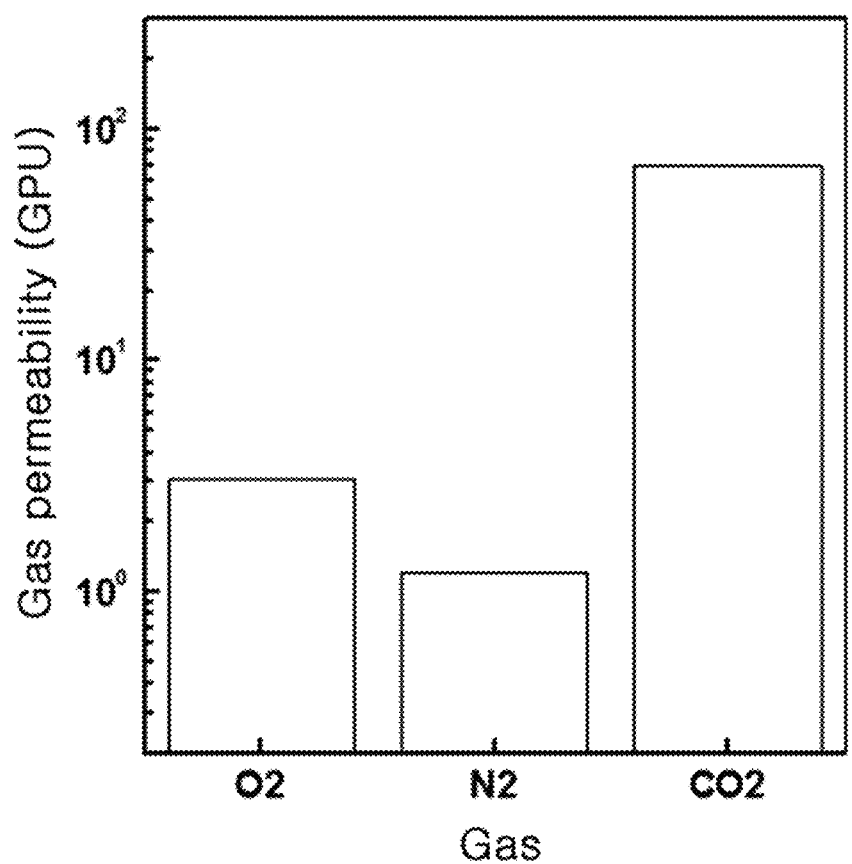
FIG. 4 shows gas permeability of Comparative Example 1-1.
Figure 5:
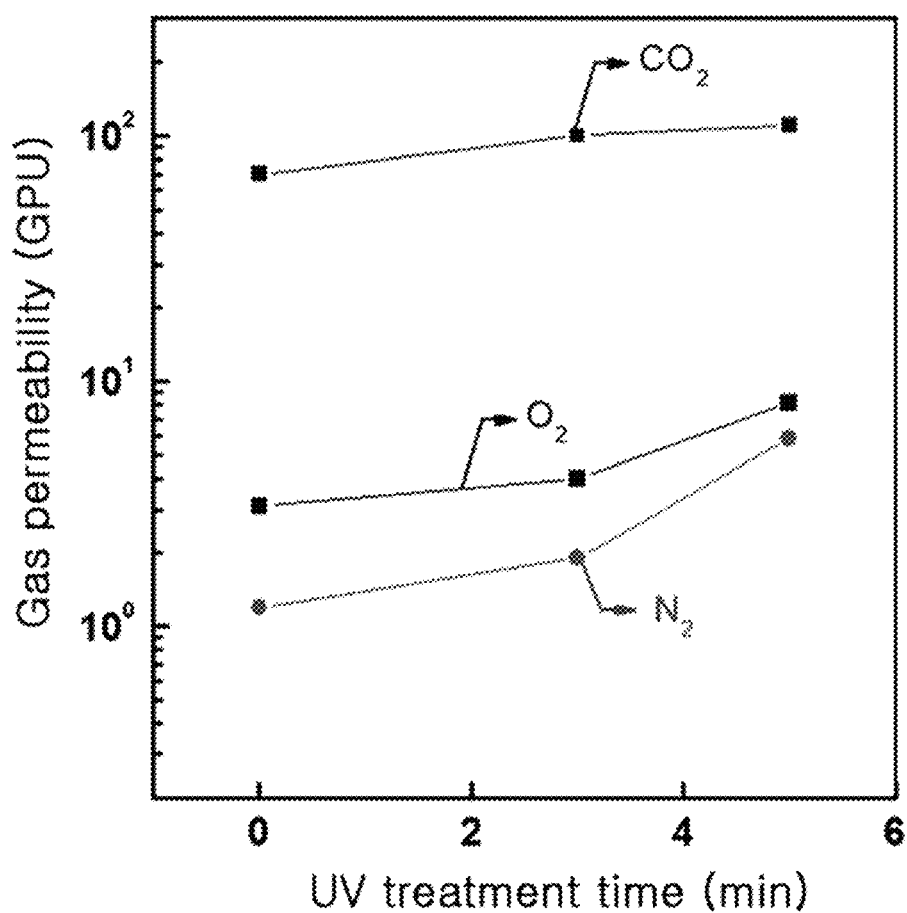
FIG. 5 shows gas permeability of Example 1-1.
Figure 6:
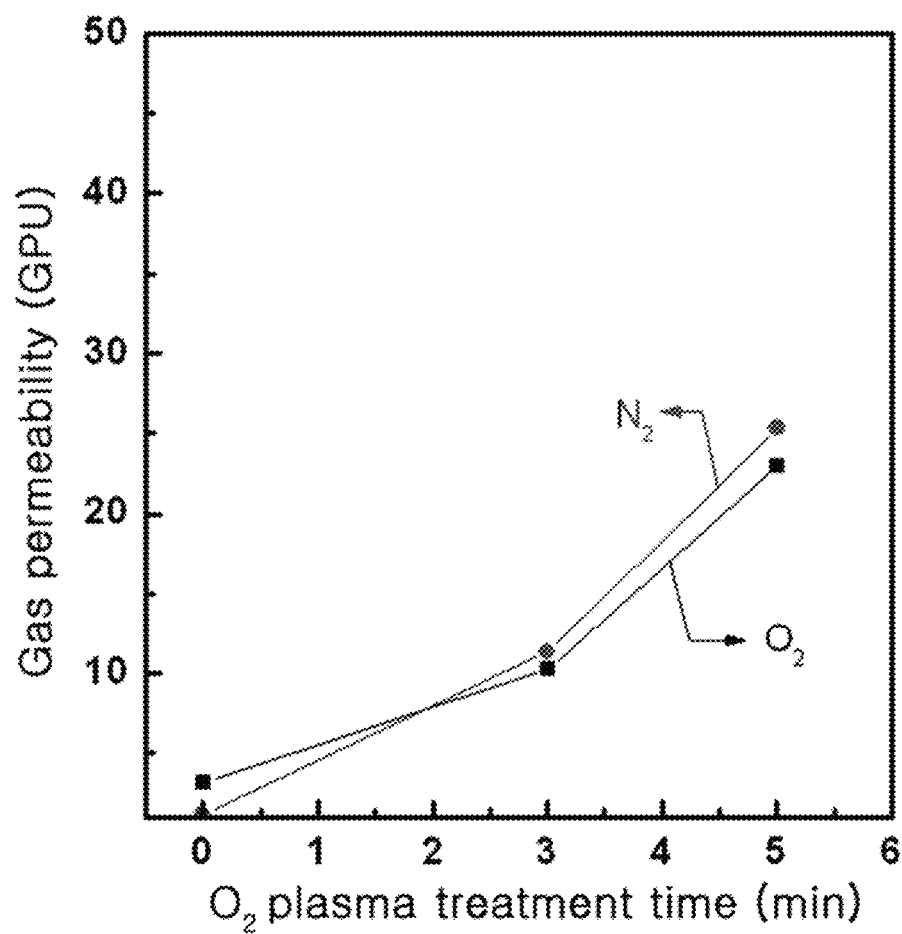
FIG. 6 shows gas permeability of Example 1-2.

The composite membranes including a graphene oxide coating layer according to Example 1-1, Example 1-2 and Comparative Example 1-1 were produced in the form of gas separation membranes again and gas permeabilities of the membranes were measured. Results are shown in the following FIGS. 4 to 6. Comparative Example 1-1 exhibits low oxygen, nitrogen and carbon dioxide gas permeabilities of 3, 1 and 70 GPU, respectively, as can be seen from FIG. 4. On the other hand, Example 1-1 exhibited a carbon dioxide gas permeability of 100 to 110 GPU, as can be seen from FIG. 5. Example 1-2 exhibited oxygen and nitrogen permeabilities of 10 to 30 GPU, as can be seen from FIG. 6. These results indicate that the gas separation membranes according to Examples 1-1 and 1-2 having an increased contact angle have an improved gas permeability, than the gas separation membrane according to Comparative Example 1-1.

Test Example 1-3: Measurement of Water Permeability of Water Disposal Membrane

Figure 7:
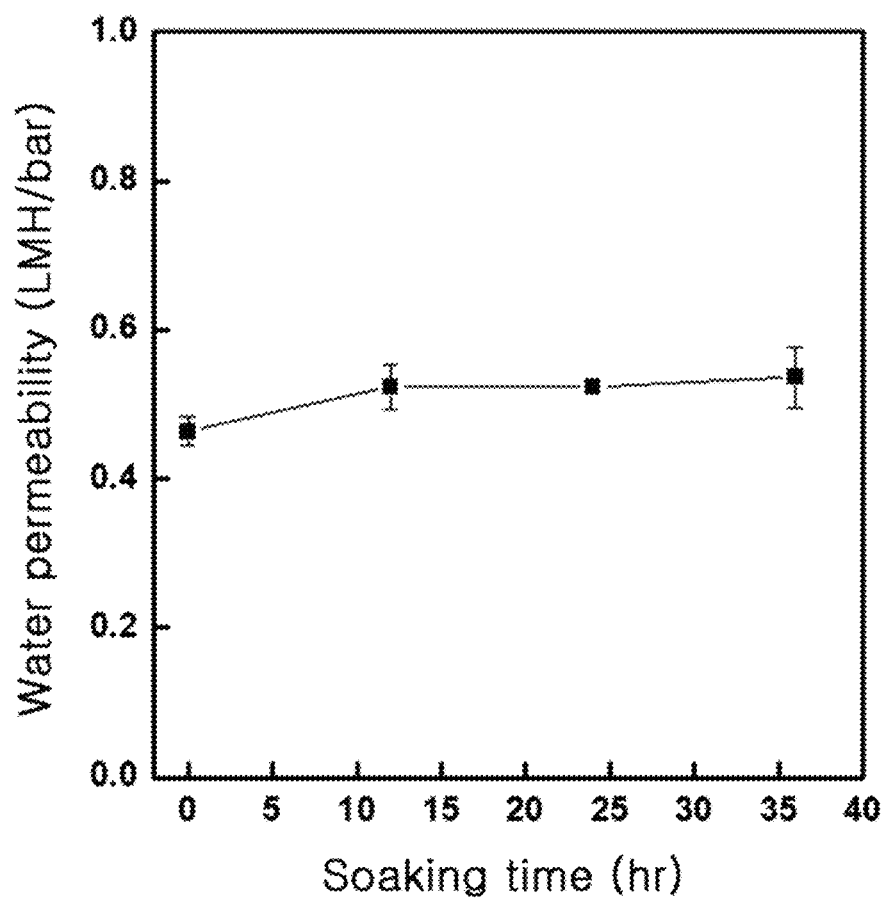
FIG. 7 shows water permeability of Comparative Example 1-1.
Figure 8:
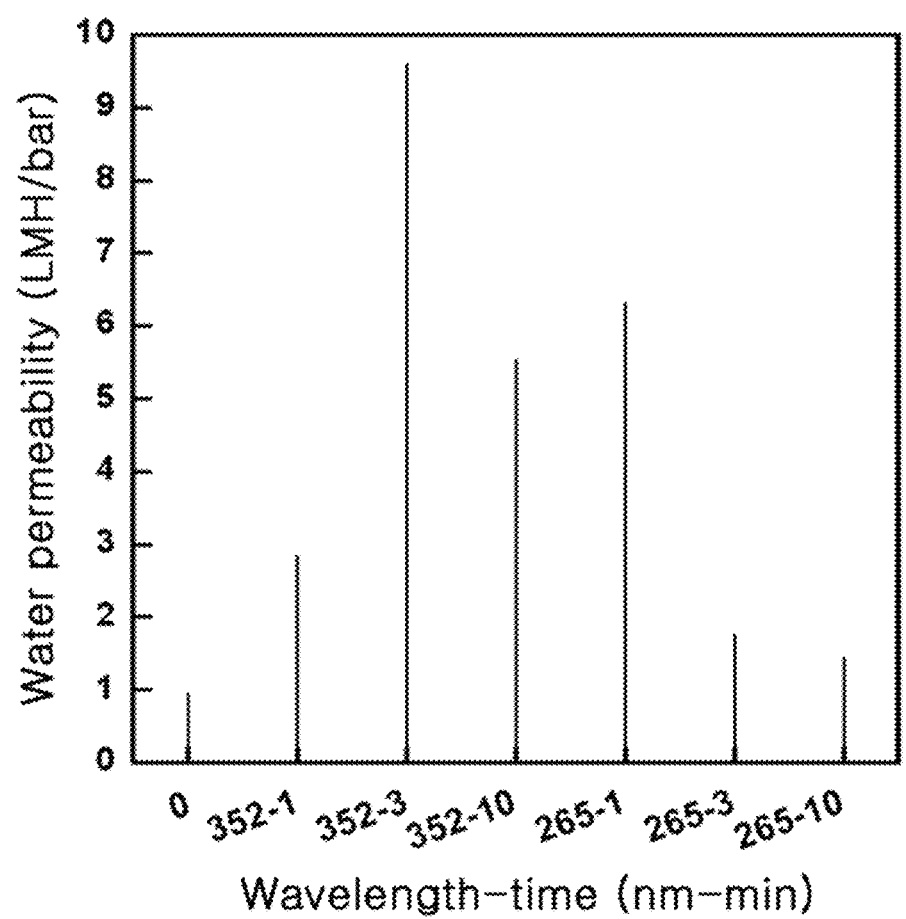
FIG. 8 shows variation in water permeability of Example 1-1.
Figure 9:
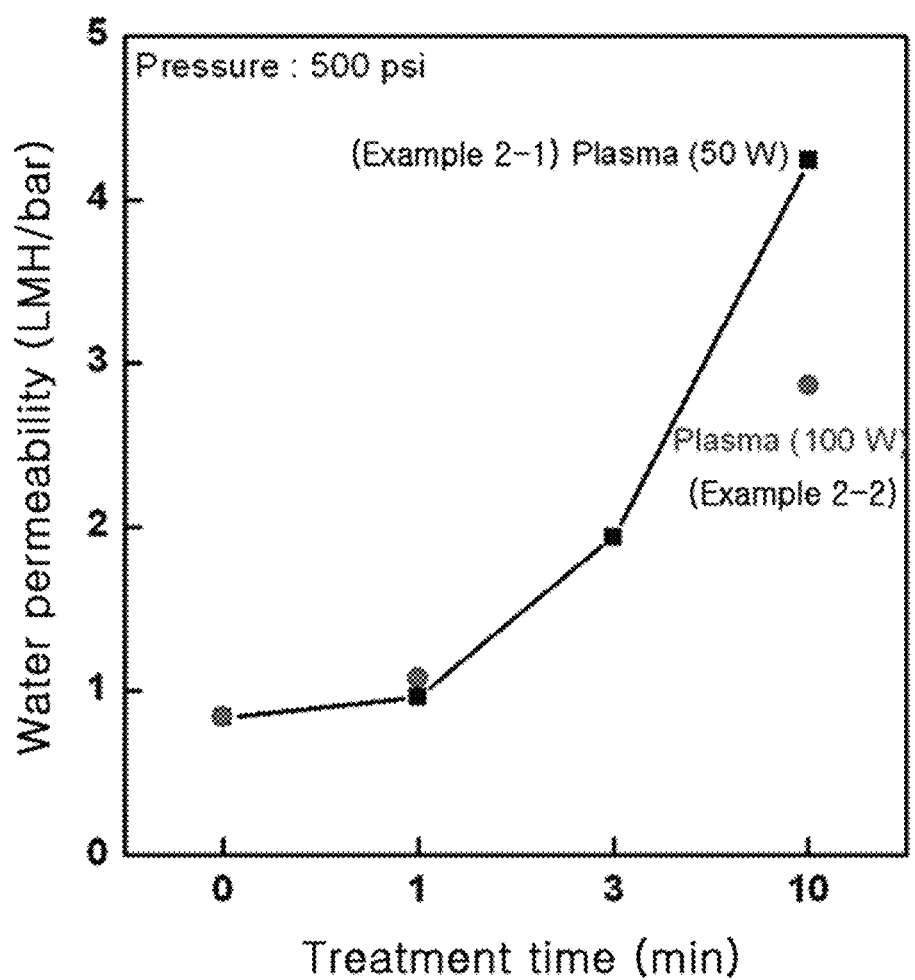
FIG. 9 shows variation in water permeability of Example 1-2.

The composite membranes including a graphene oxide coating layer according to Example 1-1, Example 1-2 and Comparative Example 1-1 were produced in the form of water disposal separation membranes and water permeabilities of the respective membranes were measured. Measurement was conducted by stirring-type total amount filtration and results are shown in FIGS. 7 to 9. First, Comparative Example 1-1 exhibited low water permeability of 0.5 to 1 LMH/bar, as can be seen from FIG. 7. On the other hand, Example 1-1 exhibited water permeability of 1.5 to 10 LMH/bar, as can be seen from FIG. 8 and Example 2 exhibited water permeability of 1 to 5 LMH/bar, as can be seen from FIG. 9. These results indicate that the water separation membranes according to Examples 1-1 and 1-2 with an increased contact angle have an improved water permeability, than the water separation membrane according to Comparative Example 1-1.

2. Examples and Test Examples Related to Composite Membrane Including Graphene Oxide Coating Layer with Improved Stability Example 2

Example 2-1

Figure 10:
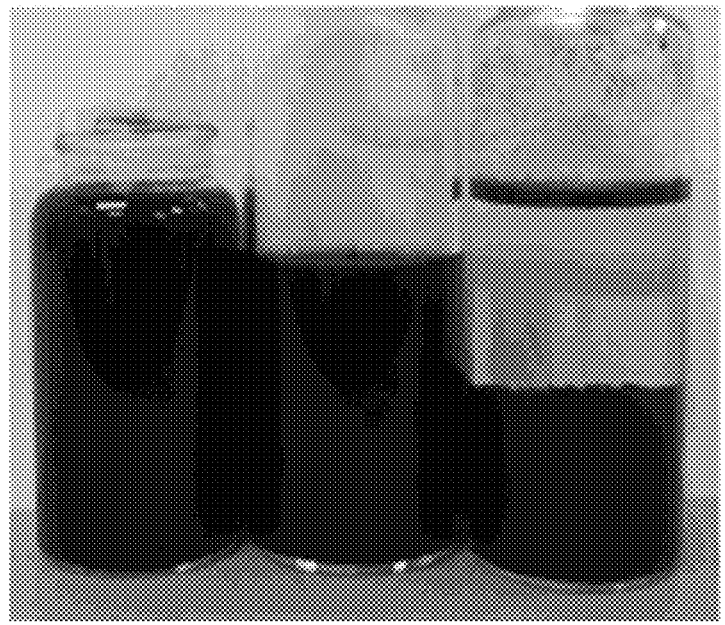
FIG. 10 is an image showing a graphene oxide dispersion used in Example 2-1, a graphene oxide dispersion having an adjusted pH and a mixed solution cross-linked by amine.
Figure 11:
FIG. 11 is an image comparing graphene oxide coating layers according to Example 2-1 and Comparative Example 2-1, after stirring in water.

100 mg of graphene oxide was dispersed in 100 ml of ultrapure water to obtain a graphene oxide dispersion. The graphene oxide dispersion was mixed with a 0.1 wt % m-phenylenediamine (MPD) solution. The resulting mixed solution was coated on a polyethersulfone porous polymer support by vapor filtration and thin film coating. The coated graphene oxide coating layer was treated with a pH 4 acid solution such as hydrochloric acid (HCl). By this production process, the final composite membrane including a graphene oxide coating layer was produced. Meanwhile, in FIG. 10, the left vial is a graphene oxide dispersion, the middle vial is a graphene oxide dispersion having a pH adjusted to 4 and the right vial is a mixed solution precipitated by cross-linkage with an amine solution. In addition, in the image of FIG. 11, the left vial represents a graphene oxide coating layer not treated with amine and the right vial represents a graphene oxide coating layer treated with amine.

Example 2-2

Unlike Example 2-1, a graphene oxide dispersion was first coated on a porous support and the porous support was then treated with an amine solution to produce a composite membrane including a graphene oxide coating layer.

Comparative Example 2-1

A graphene oxide dispersion not mixed with an amine solution was coated on a porous support to produce a composite membrane including a graphene oxide coating layer.

Test Example 2

Test Example 2-1: Evaluation of Delamination of Graphene Oxide Coating Layer

Figure 12:
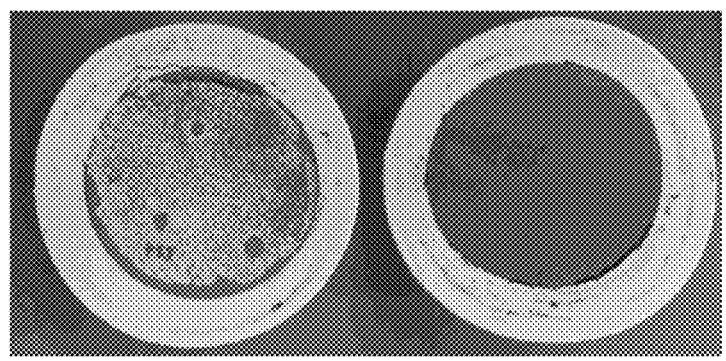
FIG. 12 is an image showing delamination in Example 2-1 and Comparative Example 2-1.
Figure 13:
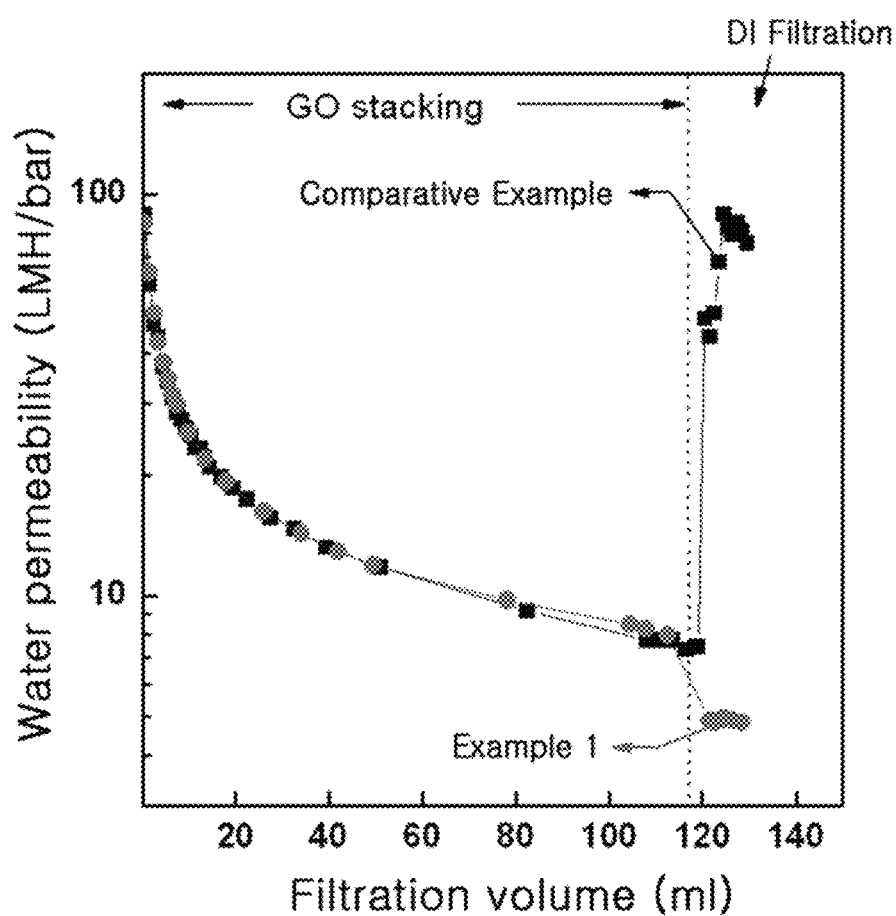
FIG. 13 is a graph showing a difference in water permeability between Example 2-2 and Comparative Example 2-1.

The composite membranes produced according to Example 2-1 and Comparative Example 2-1 were immersed and stirred in ultrapure water and whether or not the graphene oxide coating layer was delaminated was evaluated. In addition, for further quantitative analysis, variation in water permeability of the graphene oxide composite membrane produced by pressure filtration was measured and whether or not the graphene oxide coating layer was delaminated was determined. Results are shown in the following FIGS. 12 and 13. As can be seen from FIG. 12, the graphene oxide coating layer according to Example 2-1 (right side of FIG. 12) was not easily delaminated, whereas the graphene oxide coating layer according to Comparative Example 2-1 (left side of FIG. 12) was easily delaminated, as compared to Example 2-1. In addition, as can be seen from FIG. 13, Example 2-2 treated with an amine solution did not exhibit delamination by cross-linkage of graphene oxide and thus exhibited a predetermined water permeability, whereas the graphene oxide coating layer according to Comparative Example 2-1 exhibited similar water permeability before graphene oxide coating due to delamination of the coating layer.

Test Example 2-2: Measurement of Water Permeability of Water Disposal Membrane

Figure 14:
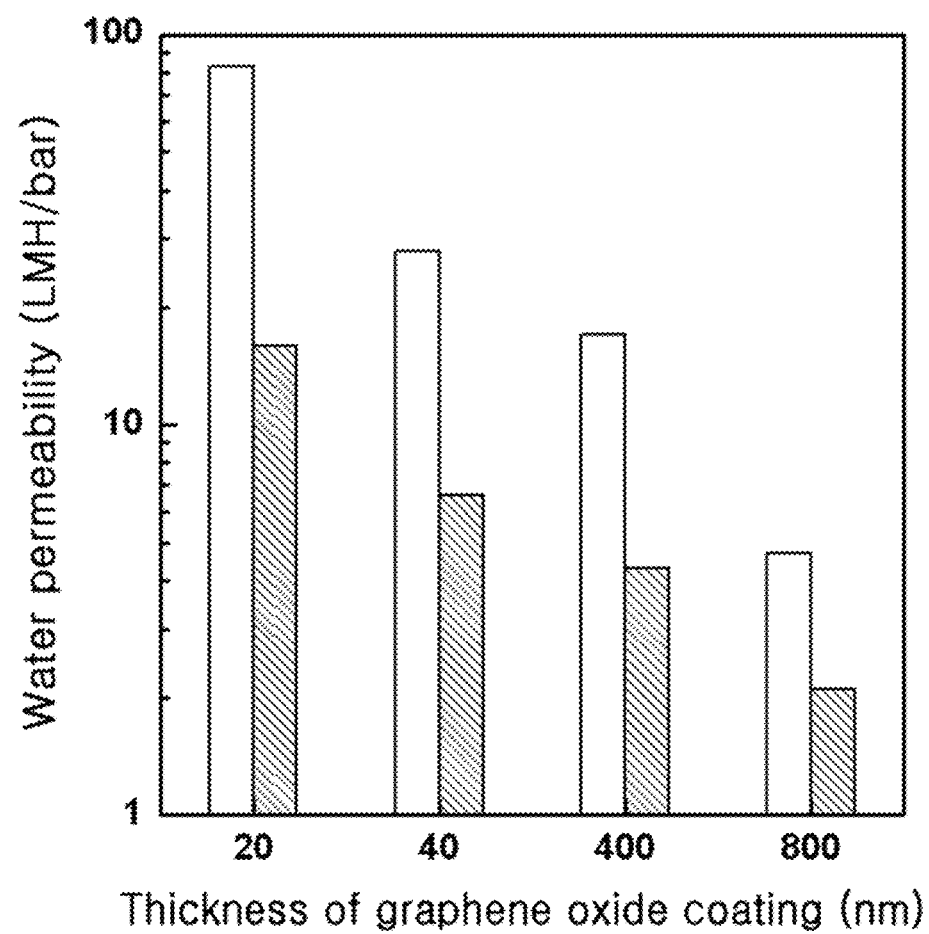
FIG. 14 is a graph comparing water permeability of graphene oxide composite membranes between before and after treating with an amine solution according to thickness of a graphene oxide surface in Example 2-2.
Figure 15:
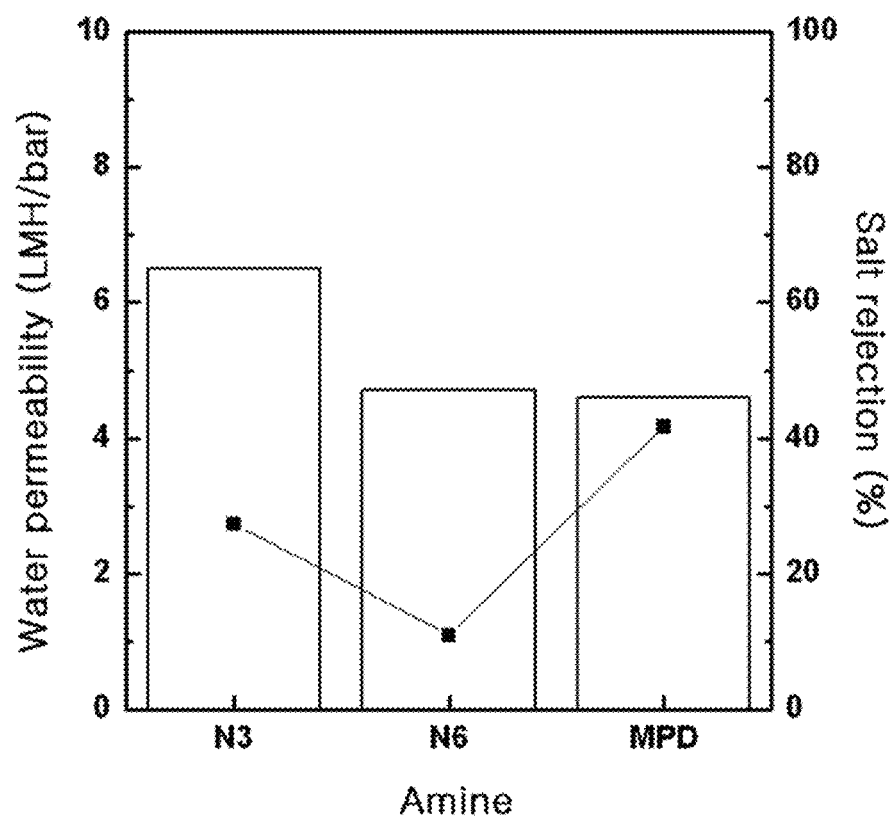
FIG. 15 is a graph comparing water permeability and salt rejection of the composite membrane including a graphene oxide coating layer after treating different kinds of amine solutions in Example 2-2.
Figure 16:
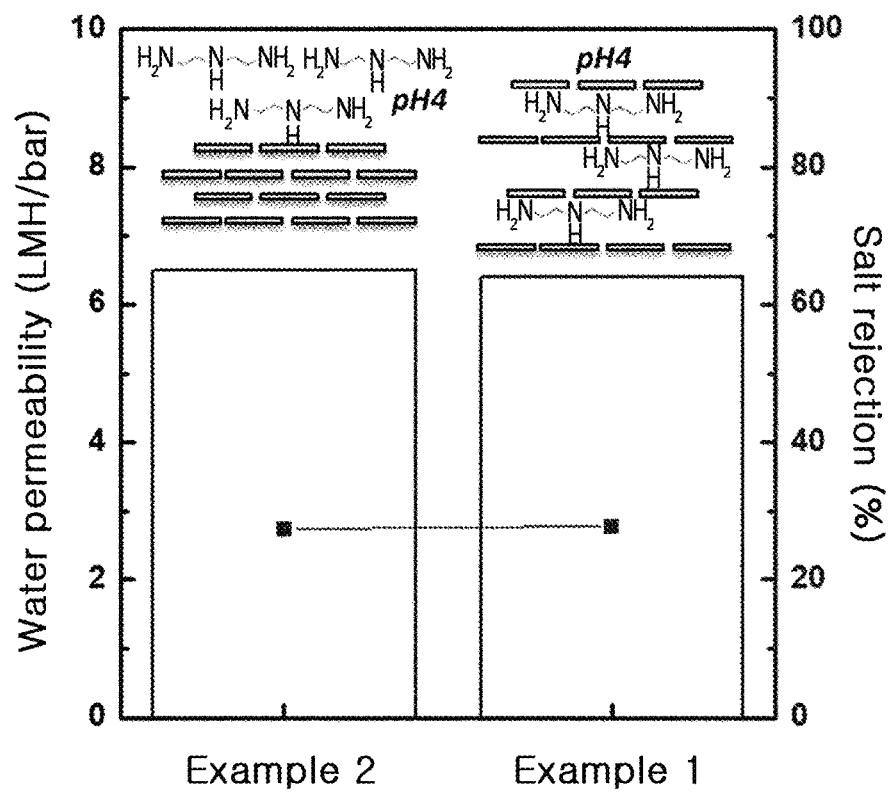
FIG. 16 is a graph comparing water permeability and salt rejection between graphene oxide composite membranes according to Example 2-2 and Example 2-3.

The composite membranes according to Example 2-1, Example 2-2 and Comparative Example 2-1 were used as water disposal membranes and testing to measure water permeability of the respective membranes was conducted. This testing was conducted by stirring-type total-amount filtration. Like the previous Test Example 2-1, it was impossible to measure water permeability of the graphene oxide coating layer according to Comparative Example 2-1 due to delamination. In addition, in Example 2-2, water permeabilities of the composite membrane according to thicknesses of the graphene oxide coating layer before and after treatment with a pH 4 diethyl triamine solution were compared and shown in FIG. 14. This indicates that water permeability is decreased due to stabilization of the graphene oxide coating layer after amine treatment. In addition, after the graphene oxide composite membrane was treated with diethyl triamine (N3), pentaethylenehexamine (N6) and m-phenylenediamine (MPD), the resulting water permeability and salt rejection are shown in FIG. 15. As can be seen from FIG. 15, an aliphatic amine-based monomer exhibits high water permeability due to an amine structure and salt rejection is relatively high when an aromatic amine is used. As can be seen from FIG. 16, as a result of comparison in water permeability and salt rejection between graphene oxide composite membranes produced according to Examples 2-1 and 2-2, there is no great difference therebetween. This means that amine contacting the graphene oxide surface is diffused into the graphene oxide layer and cross-linkage occurs over the entire area of the graphene oxide layer.

Test Example 2-3

Figure 17:
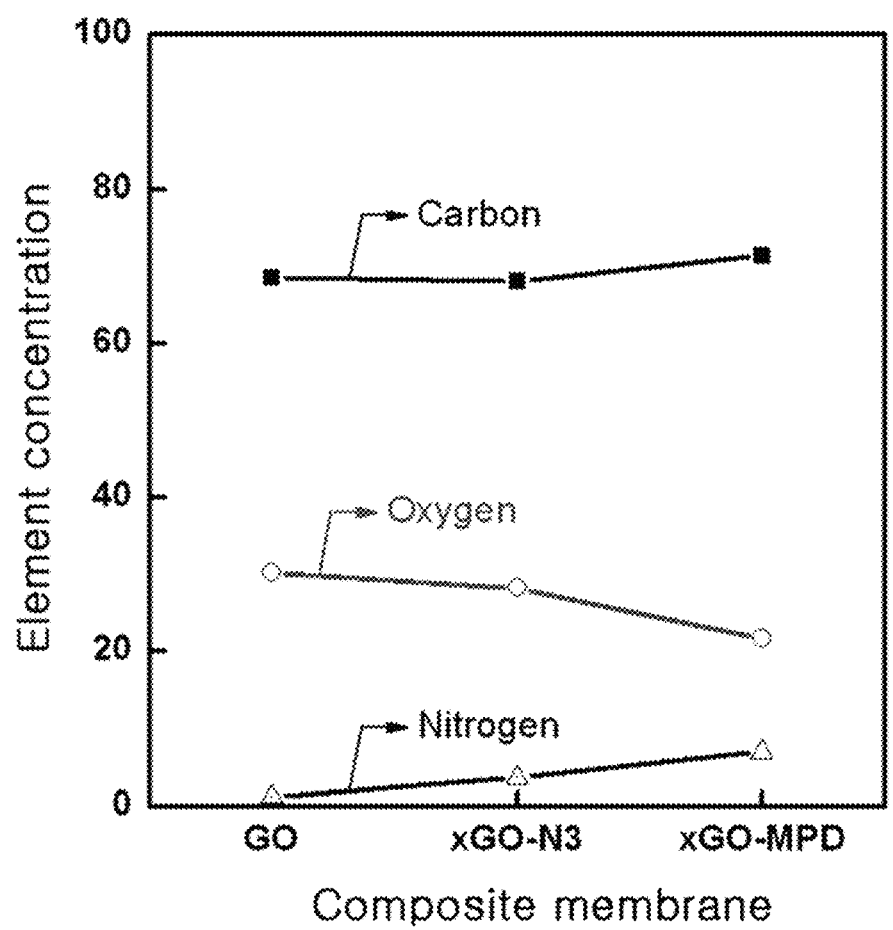
FIG. 17 is a graph comparing surface element analysis results in Example 2-2.
Figure 18:
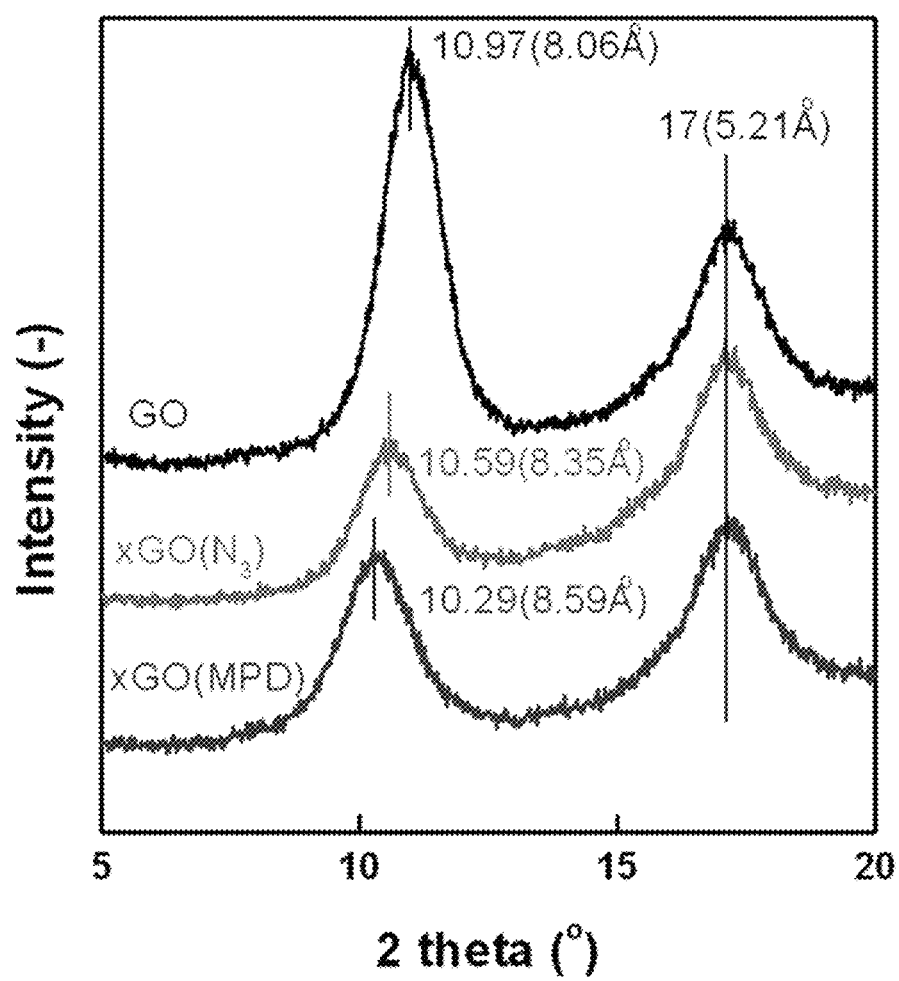
FIG. 18 is a graph showing analysis of crystallinity and interlayer distance variation of the graphene oxide layer according to Example 2-2.

Meanwhile, as an additional test, surface element analysis and crystallinity were compared between Comparative Example 2-1 and Example 2-2. These results are shown in FIGS. 17 to 18. As can be seen from FIG. 17, as compared to Comparative Example 2-1, in Example 2-2, the amine group is bonded to the graphene oxide layer as the content of nitrogen element increases. In addition, as can be seen from FIG. 18, as compared to Comparative Example 2-1, Example 2-2 exhibits a slightly increased interlayer distance because amine is inserted into a graphene oxide laminate structure.

3. Example and Test Examples Related to Porous Polymer Support for Composite Membranes Including Graphene Oxide Coating Layer with Improved Permeability Example 3

Example 3-1

A PES polymer and a PVP polymer as an additive were dissolved in a DMF solution in amounts of 12% by weight and 3% by weight, respectively, to prepare a uniform dope and the polymer solution was cast on a PET non-woven fabric to a thickness of 250 µm and a porous polymer support was produced in 25° C. water by phase transition.

Example 3-2

A PES polymer and a PVP polymer as an additive were dissolved in a DMF solution in amounts of 12% by weight and 3% by weight, respectively, to prepare a uniform dope, and 10% by weight of ethanol was then added thereto. The polymer solution was cast on a PET non-woven fabric to a thickness of 250 µm and a porous polymer support was produced in 25° C. water by phase transition.

Example 3-3

Composite membranes were produced by phase transition from the porous polymer supports produced according to Example 3-1 and Example 3-2 and oxygen plasma was treated at 50 W and 100 W for 10 minutes, in order to maximize surface porosity of the composite membranes.

Comparative Example 3-1

A porous polymer support layer was produced in the same manner as in Example 1, except that PVP was not mixed and only PES was mixed.

Test Example 3

Test Example 3-1: Measurement of Surface Porosity of Porous Polymer Support

Figure 19:
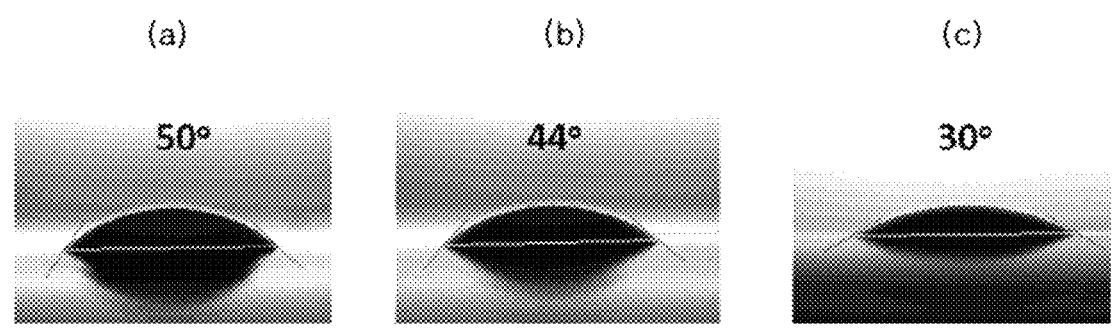
FIG. 19 shows measurement results of variation in contact angle according to content of PVP in Example 3-1.
Figure 20:
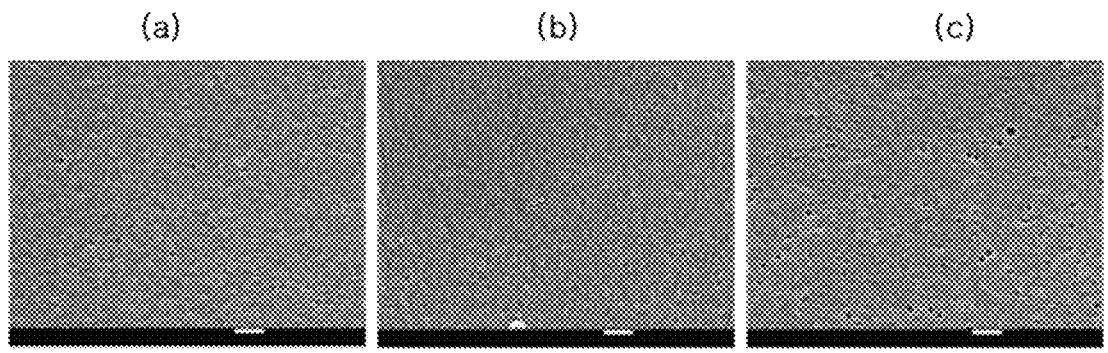
FIG. 20 shows measurement results of surface porosity according to content of PVP in Example 3-1.
Figure 21:
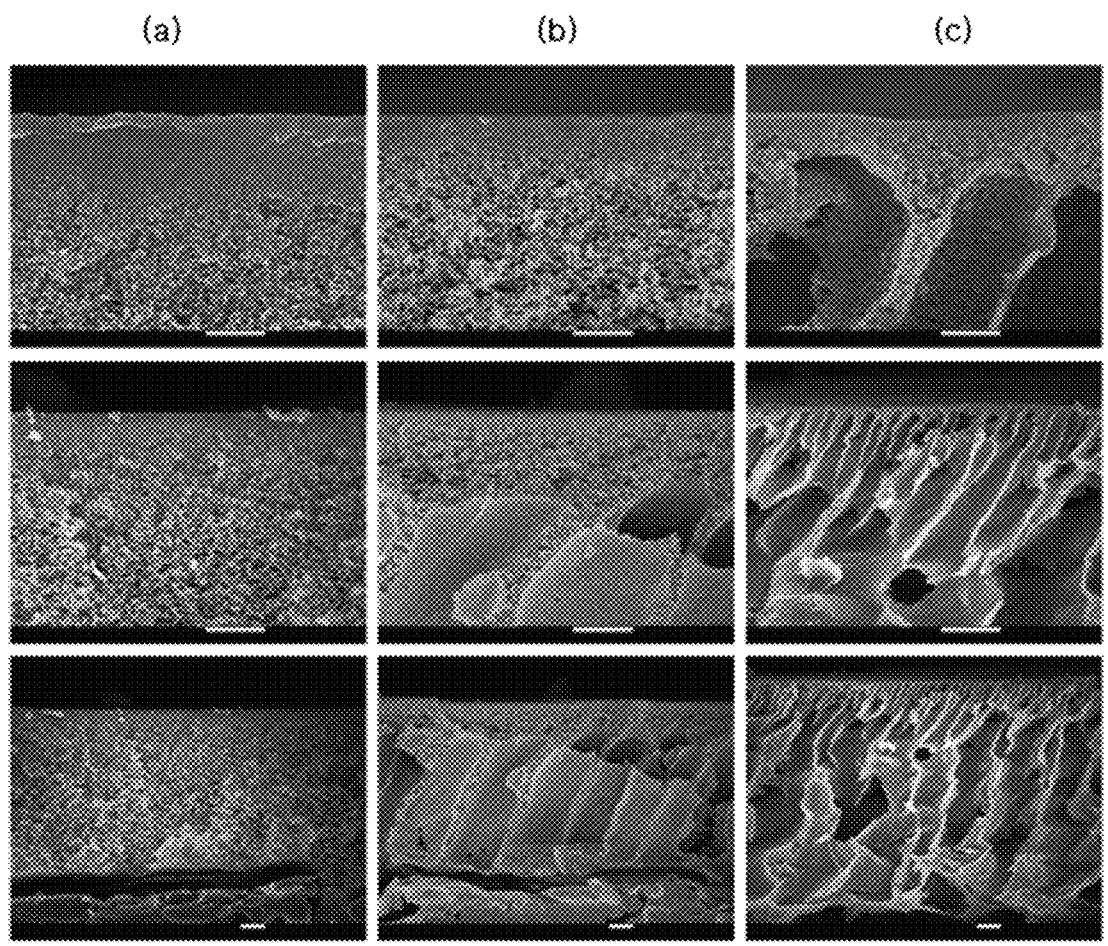
FIG. 21 shows structure variation of the porous polymer support according to content of PVP in Example 3-1.

When, in the production process according to Example 3-1, contents of PVP are 8% by weight (FIG. 19A), 5% by weight (FIG. 19B) and 2% by weight (FIG. 19C), as the content of PVP decreases, contact angle decreases and surface hydrophilicity thus decreases, as can be seen from FIG. 19. In addition, as can be seen from FIGS. 20 and 21, as the content of PVP decreases (FIG. 20A and FIG. 21A: 8% by weight, FIG. 20B and FIG. 21B: 5% by weight, FIG. 20C and FIG. 21C: 2% by weight), surface porosity increases and formation of a porous support structure is facilitated. The results indicate that, as the content of PVP decreases, surface porosity of the porous polymer support increases and permeability thus improves.

Figure 22:
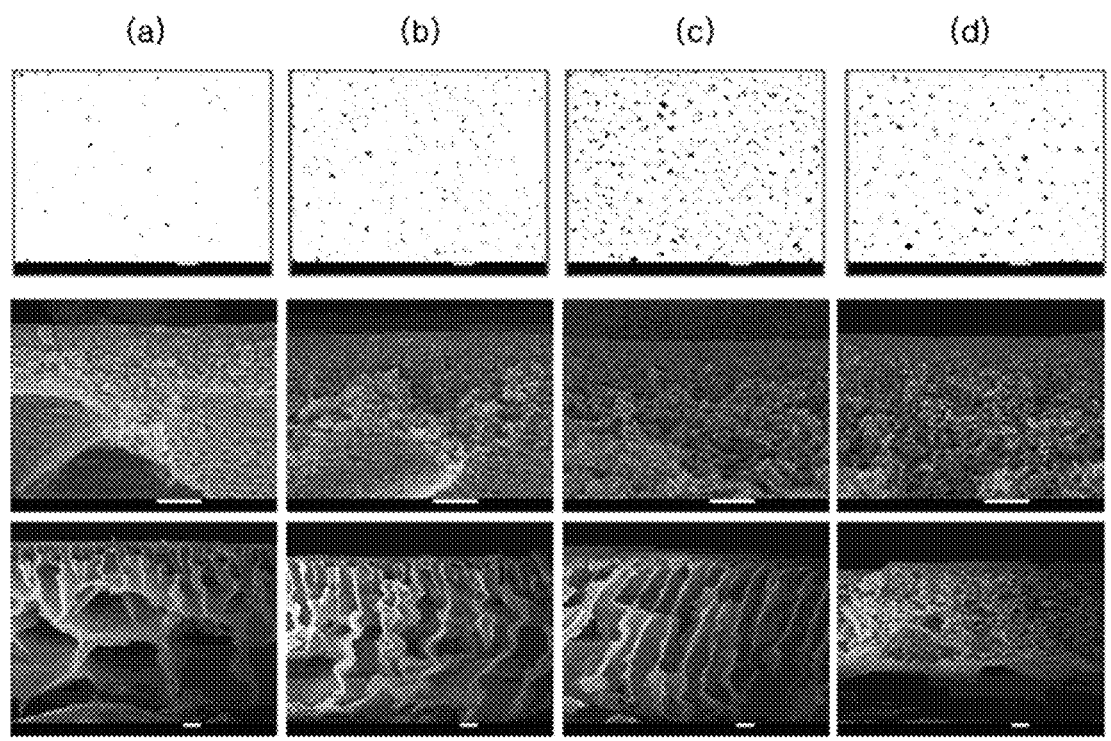
FIG. 22 shows surface porosity variation and structure variation of the porous polymer support according to ethanol content variation in Example 3-2.

Meanwhile, when, in the production process according to Example 3-2, the contents of ethanol are 0% by weight (FIG. 22A), 5% by weight (FIG. 22B), 10% by weight (FIG. 22C), and 15% by weight (FIG. 22D), as can be seen from FIG. 22, as the content of ethanol increases, surface porosity increases, and when the content exceeds 10% by weight, surface porosity decreases again.

Test Example 3-2: Measurement of Carbon Dioxide Gas Permeability

Figure 23:
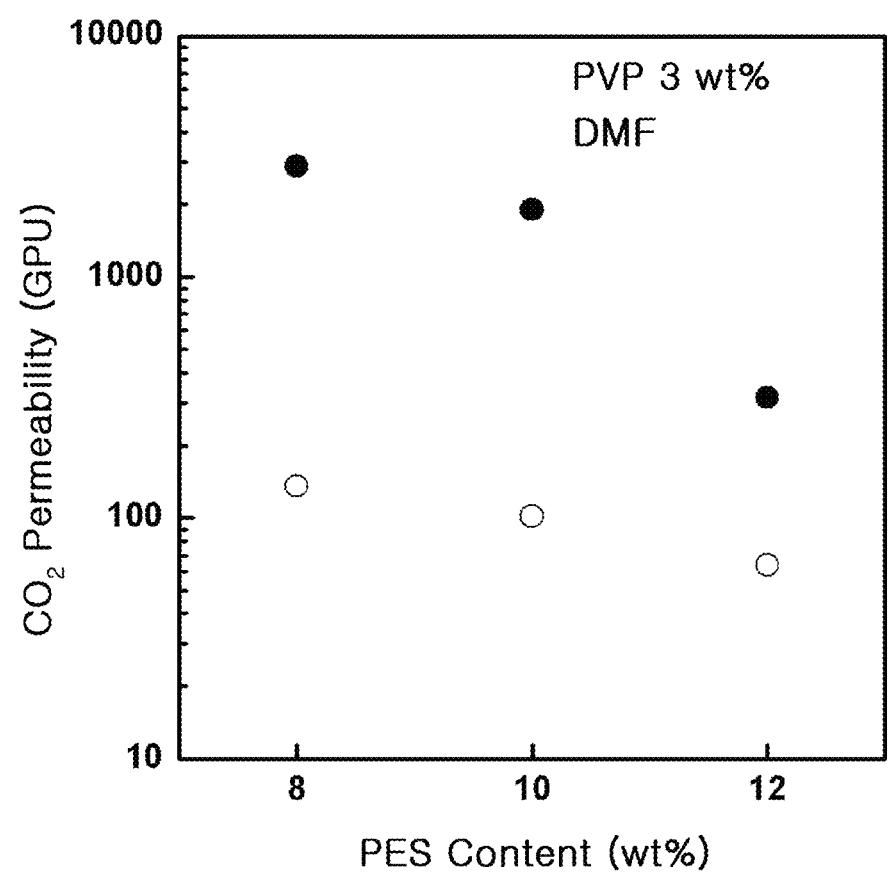
FIG. 23 is a graph showing carbon dioxide permeability variation according to PES content in Example 3-1.
Figure 24:
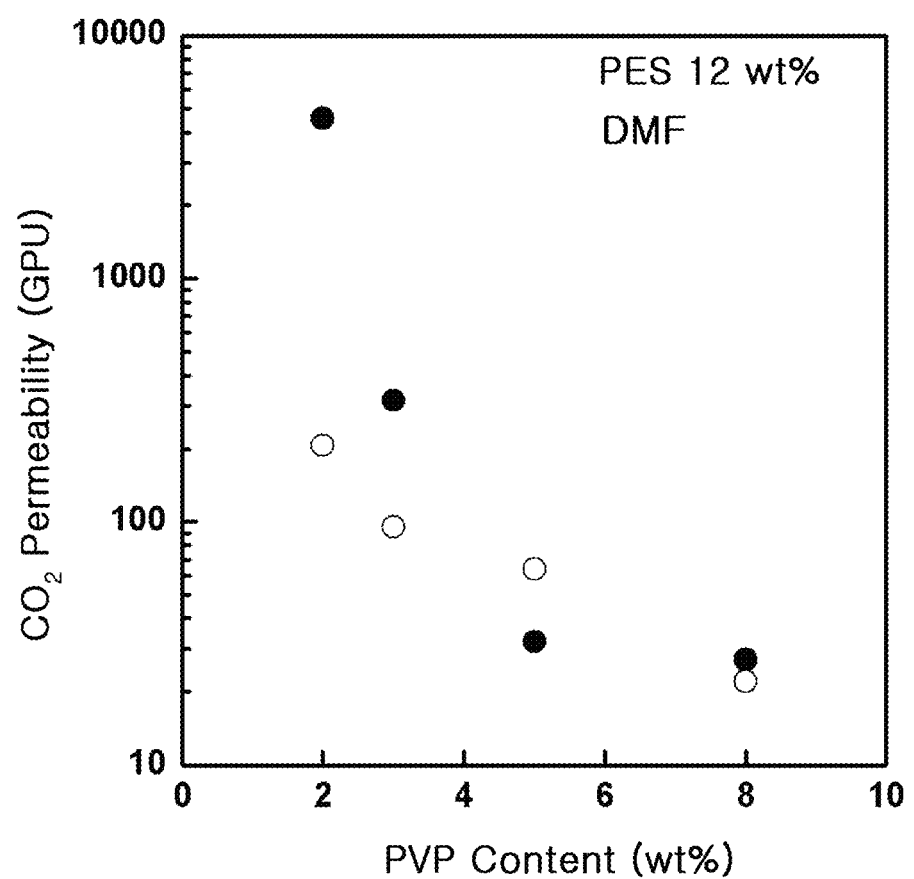
FIG. 24 is a graph showing carbon dioxide permeability variation according to PVP content in Example 3-1.

The following FIG. 23 shows results of carbon dioxide gas permeability measured on the porous polymer support (●) according to Example 3-1 and the gas separation membrane (○) produced by coating graphene oxide on the porous polymer support. The measurement of carbon dioxide gas permeability in FIG. 23 was conducted on the porous polymer support produced under the same PVP content and a different PES content. The results indicate that, as the content of PES decreases, surface and entire porosity increase and carbon dioxide gas permeability thus increases. Meanwhile, FIG. 24 (●: porous polymer support according to Example 3-1, ○: gas separation membrane produced by coating graphene oxide on the porous polymer support according to Example 3-1) shows results of measurement conducted in the same manner as in Example 3-1, except that the content of PVP was changed while the content of PES was maintained. The results indicate that PVP has a greater effect on carbon dioxide permeability than PES.

Figure 25:
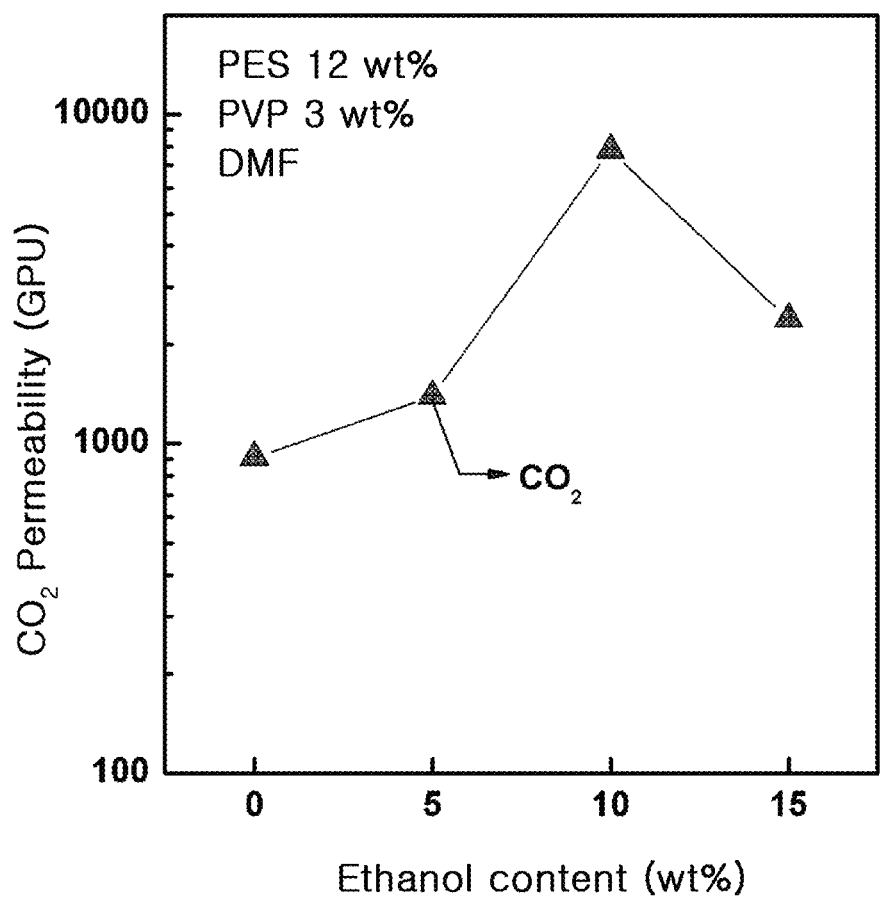
FIG. 25 is a graph showing carbon dioxide permeability variation of the porous polymer support according to ethanol content in Example 3-2.
Figure 26:
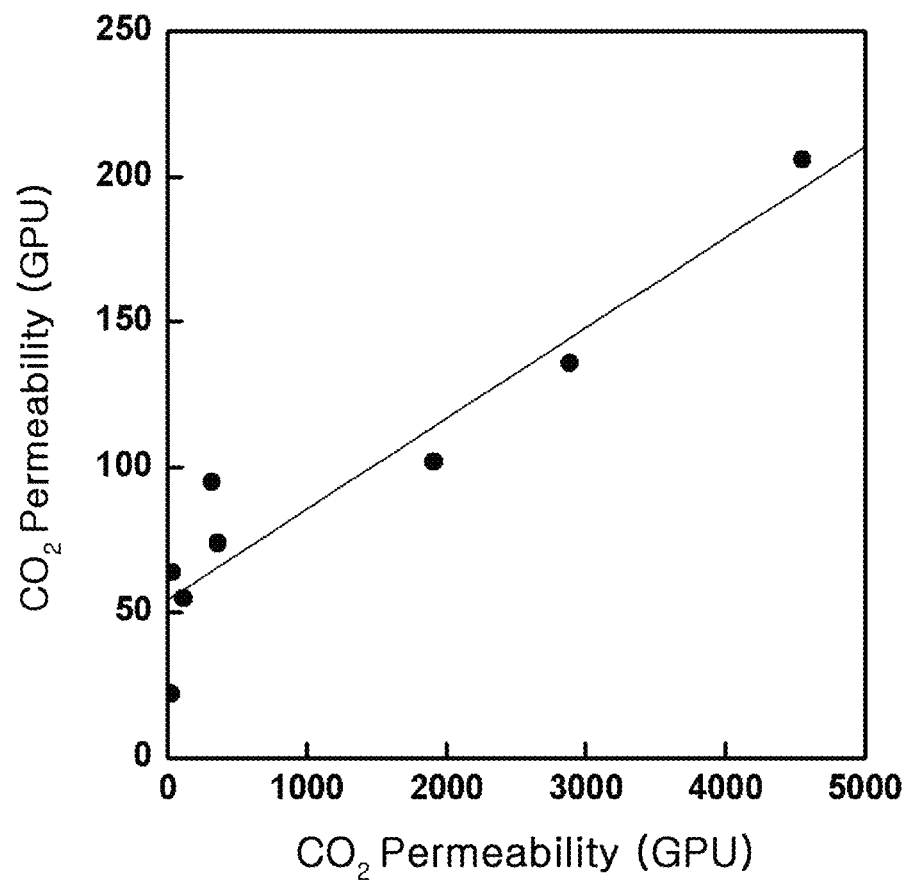
FIG. 26 is a graph showing carbon dioxide permeability variation of the gas separation membrane produced in Example 3-2 according to ethanol content.

Meanwhile, carbon dioxide gas permeability of the porous polymer support containing ethanol according to Example 3-2 was measured. Results are shown in FIG. 25 below. As can be seen from FIG. 25, as the content of ethanol increases, carbon dioxide gas permeability greatly increases. However, when ethanol exceeds about 10% by weight, carbon dioxide gas permeability begins to decrease again. In addition, FIG. 26 shows results of measurement of carbon dioxide gas permeability of the gas separation membrane produced by coating graphene oxide on the porous polymer support of Example 3-2. In this case, as well, carbon dioxide gas permeability was greatly improved.

Figure 27:
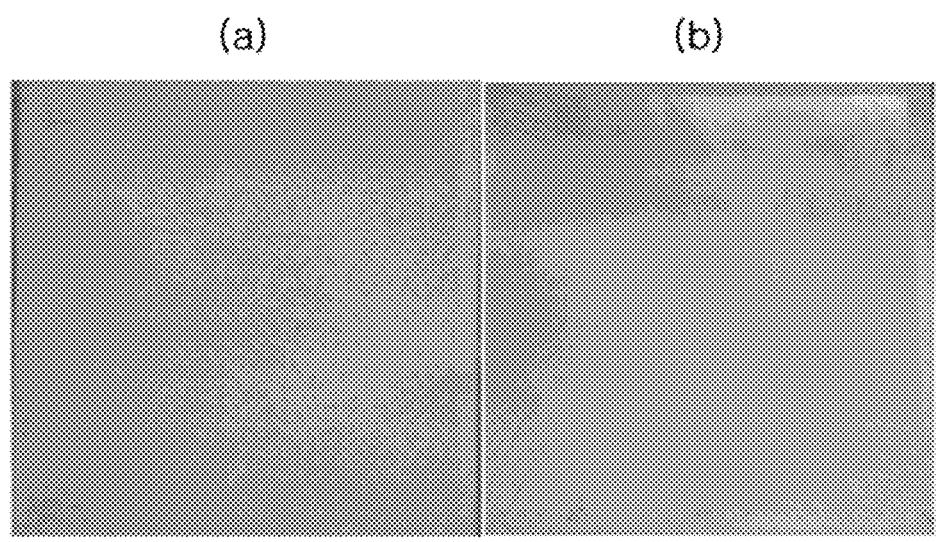
FIG. 27 is an image comparing surface conditions after graphene oxide coating between Example 3-1 and Comparative Example 3-1.

Test Example 3-3: Measurement of Graphene Oxide Coating Layer Surface Depending on Addition of PVP Whether or not graphene oxide coating layers produced by coating graphene oxide on porous polymer supports according to Example 3-1 and Comparative Example 3-1 were easily delaminated was determined. Results are shown in FIG. 27. As can be seen from FIG. 27, in Comparative Example 3-1 (FIG. 27A), it is difficult to form a uniform graphene oxide coating layer due to low attractive force between the graphene oxide coating layer and the porous polymer support. On the other hand, it can be seen from Example 3-1 (FIG. 27B), a uniform coating layer can be formed due to attractive force between PVP and the graphene oxide coating layer. In addition, the graphene oxide coating layer is not easily delaminated due to increased attractive force.

Test Example 3-4: Results of Plasma Treatment

Figure 28:
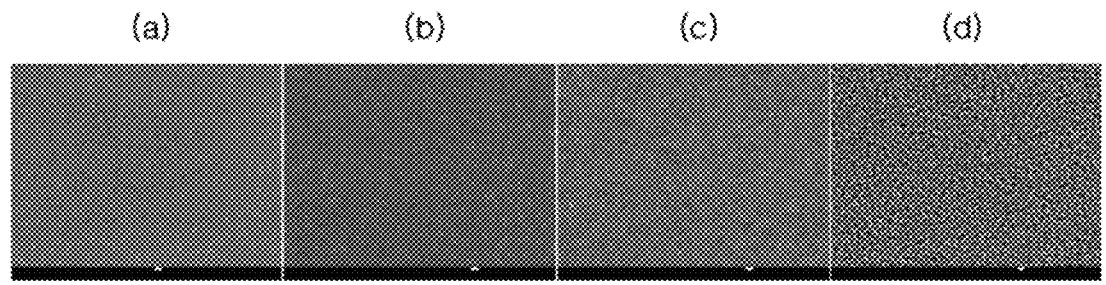
FIG. 28 shows surface porosity variation of a porous polymer support after oxygen plasma treatment according to Example 3-3.
Figure 29:
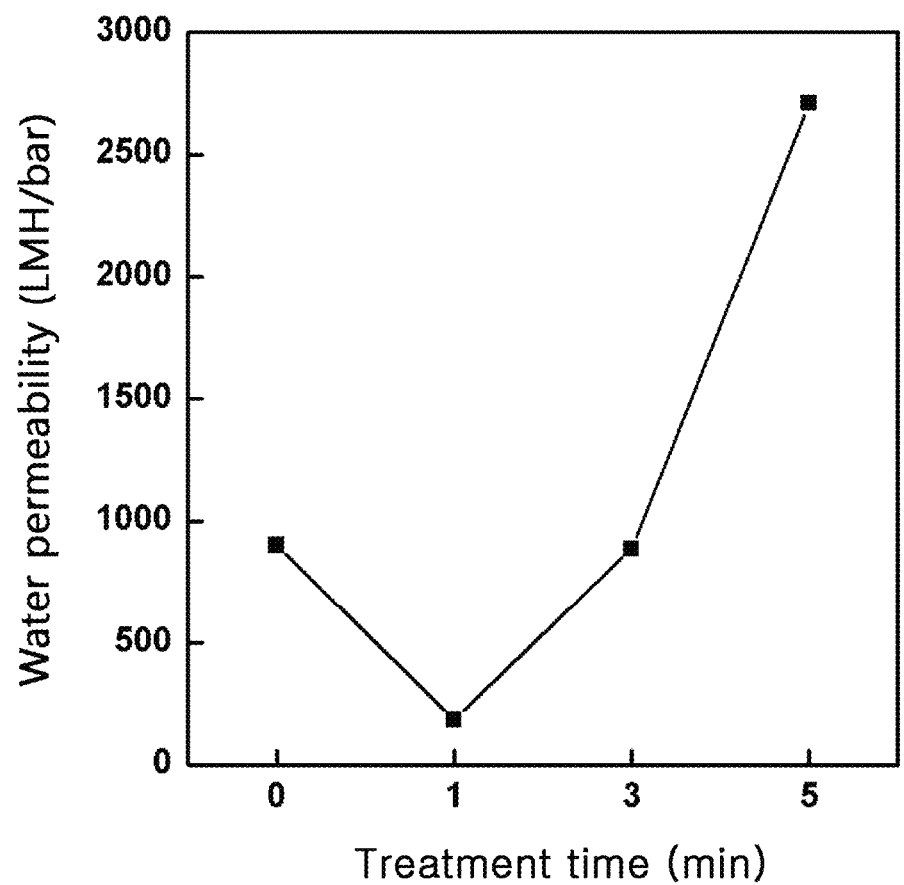
FIG. 29 is a graph showing water permeability variation of the porous polymer support after oxygen plasma treatment according to Example 3-3.
Figure 30:
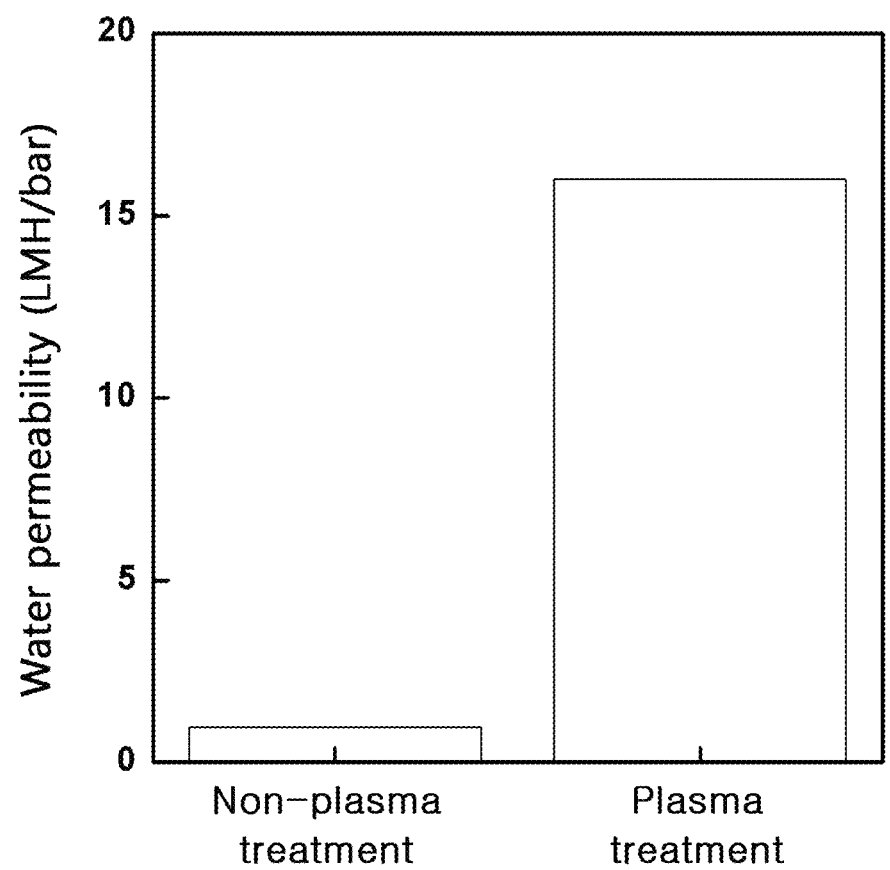
FIG. 30 is a graph showing water permeability variation of a composite membrane produced by treating with oxygen plasma and then coating with graphene oxide as in Example 3-3.

An effect, which can be obtained by plasma treatment, was measured as shown in Example 3-3. As a result, as can be seen from FIG. 28 (a: 0 min, b: 2 min, c: 3 min, and d: 5 min), surface porosity greatly increases over time. As can be seen from FIG. 29, water permeability of the porous polymer support also greatly increases under predetermined conditions. In addition, as can be seen from FIG. 30, water permeability of the composite membrane produced by coating graphene oxide on the porous polymer support is greatly increased.

The invention has been described in detail with reference to preferred embodiments thereof. However, it will be appreciated that changes may be made in these embodiments without departing from the principles and spirit of the invention, the scope of which is defined in the appended claims and their equivalents.

The invention claimed is:

1. A composite membrane comprising:
   a porous polymer support; and
   a plasma-treated graphene oxide coating layer having a contact angle of 20 to 60° formed on the porous polymer support,
   wherein the porous polymer support comprises mixtures of one or more selected from the group consisting of polysulfone (PSF), polyether sulfone (PES), polyvinylidene fluoride (PVDF) and polyacrylonitrile (PAN) with polyvinylpyrrolidone (PVP) or polyethyleneimine (PEI).

2. A porous polymer support for composite membranes comprising a plasma-treated graphene oxide coating layer comprising a hydrophilic amine compound and having a surface porosity of 5 to 20%,
   wherein the porous polymer support is comprises mixtures of one or more selected from the group consisting of polysulfone (PSF), polyether sulfone (PES), polyvinylidene fluoride (PVDF) and polyacrylonitrile (PAN) with polyvinylpyrrolidone (PVP) or polyethyleneimine (PEI).

3. A method of producing a composite membrane including a graphene oxide coating layer comprising:
   1) coating a graphene oxide dispersion on a porous polymer support; and
   2) conducting UV irradiation or plasma treatment after step 1) to form a graphene oxide coating layer having a contact angle of 20 to 60°;
   wherein the porous polymer support comprises mixtures of one or more selected from the group consisting of polysulfone (PSF), polyether sulfone (PES), polyvinylidene fluoride (PVDF) and polyacrylonitrile (PAN) with polyvinylpyrrolidone (PVP) or polyethyleneimine (PEI).

4. The method according to claim 3, wherein UV irradiation in step 2) is carried out at 200 to 400 nm for 0.5 to 10 minutes.

5. The method according to claim 3, wherein the plasma treatment in step 2) is carried out at 10 to 100 W for 1 to 15 minutes.

6. A method of producing a composite membrane including a graphene oxide coating layer comprising:
   1) coating a graphene oxide dispersion on a porous support; and
   2) treating the graphene oxide coated on the porous support with an amine solution to form a graphene oxide coating layer having an amide bond formed between a carboxyl group of graphene oxide and an amine group;
   wherein the porous polymer support comprises mixtures of one or more selected from the group consisting of polysulfone (PSF), polyether sulfone (PES), polyvinylidene fluoride (PVDF) and polyacrylonitrile (PAN) with polyvinylpyrrolidone (PVP) or polyethyleneimine (PEI).

7. A method of producing a composite membrane including a graphene oxide coating layer comprising:
   1) mixing a graphene oxide dispersion with an amine solution; and
   2) coating the mixed solution on a porous support to form a graphene oxide coating layer having an amide bond formed between a carboxyl group of graphene oxide and an amine group;
   wherein the porous polymer support comprises mixtures of one or more selected from the group consisting of polysulfone (PSF), polyether sulfone (PES), polyvinylidene fluoride (PVDF) and polyacrylonitrile (PAN) with polyvinylpyrrolidone (PVP) or polyethyleneimine (PEI).

8. The method according to claim 7, wherein the amine present in the amine solution is present in an amount of 0.1 to 2.0% by weight.

9. The method according to claim 7, wherein the amine is present in an amount of 0.01 to 2.0% by weight in the total mixed solution.

10. The method according to claim 7, wherein the amine comprises one or more selected from the group consisting of ethylenediamine, diethylenetriamine, triethylenetetramine, tetraethylenepentamine, pentaethylenehexamine, phenylenediamine (PD) and polyethyleneimine.

11. The method according to claim 7, further comprising: adjusting a pH of the amine solution to 3 to 5 after step 2).

12. The method according to claim 7, wherein the coating is carried out by one or more methods selected from the group consisting of vapor filtration, thin film coating, spin coating, spray coating and dip coating.

13. A method of producing a porous polymer support for composite membranes including a graphene oxide coating layer comprising:
   1) mixing a compound for porous polymer supports and a hydrophilic amine compound with a solvent to prepare a mixed solution; and
   2) curing the mixed solution;
   wherein the porous polymer support comprises mixtures of one or more selected from the group consisting of polysulfone (PSF), polyether sulfone (PES), polyvinylidene fluoride (PVDF) and polyacrylonitrile (PAN) with polyvinylpyrrolidone (PVP) or polyethyleneimine (PEI).

14. The method according to claim 13, wherein the porous polymer support comprises one or more selected from the group consisting of polysulfone (PSF), polyether sulfone (PES), polyvinylidene fluoride (PVDF) and polyacrylonitrile (PAN).

15. The method according to claim 13, wherein the hydrophilic amine compound is polyvinylpyrrolidone (PVP) or polyethylenimine (PEI).

16. The method according to claim 13, wherein the compound for the porous polymer support is present in an amount of 5 to 25% by weight in the mixed solution of step 1).

17. The method according to claim 13, wherein the hydrophilic amine compound is present in an amount of 0.1 to 10% by weight in the mixed solution of step 1).

18. The method according to claim 13, wherein the mixed solution of step 1) further comprises one or more selected from the group consisting of methanol, ethanol and isopropyl alcohol.

19. The method according to claim 18, wherein the one or more selected from the group consisting of methanol, ethanol and isopropyl alcohol are present in an amount of 0.1 to 20% by weight in the mixed solution.

20. The method according to claim 13, further comprising conducting plasma treatment after step 2).

21. The method according to claim 13, wherein the porous polymer support for composite membranes including a graphene oxide coating layer produced by the method has a surface porosity of 5 to 20%.

\* \* \* \* \*